US012611760B2

(12) United States Patent (10) Patent No.: US 12,611,760 B2

Heinzelmann et al. (45) Date of Patent: *Apr. 28, 2026

(54) HAND-GUIDED WORK APPARATUS

(71) Applicant: Andreas Stihl AG & Co. KG,
Waiblingen (DE)

(72) Inventors: Georg Heinzelmann, Winnenden (DE);
Johann-Sebastian Renz, Gomaringen
(DE); Marco Weber, Backnang (DE)

(73) Assignee: Andreas Stihl AG & Co. KG,
Waiblingen (DE)

( * ) Notice: Subject to any disclaimer, the term of this
patent is extended or adjusted under 35
U.S.C. 154(b) by 0 days.

This patent is subject to a terminal dis-
claimer.

(21) Appl. No.: 18/766,298

(22) Filed: Jul. 8, 2024

(65) Prior Publication Data

US 2025/0018546 A1 Jan. 16, 2025

(30) Foreign Application Priority Data

Jul. 10, 2023 (DE) ..................... 10 2023 118 171.8
Jul. 10, 2023 (DE) ..................... 10 2023 118 179.3
Jul. 10, 2023 (DE) ..................... 10 2023 118 186.6

(51) Int. Cl.
*B25F 5/00* (2006.01)
*B25F 5/02* (2006.01)
*B27B 17/00* (2006.01)
*H02K 7/14* (2006.01)

(52) U.S. Cl.
CPC ............. *B25F 5/008* (2013.01); *H02K 7/145*
(2013.01); *B27B 17/0008* (2013.01)

(58) Field of Classification Search
CPC ...... B25F 5/008; H02K 7/145; B27B 17/0008
See application file for complete search history.

(56) References Cited

U.S. PATENT DOCUMENTS

| | | | | |
|---|---|---|---|---|
| 5,168,837 A | * | 12/1992 | Scholz | .................... B27B 17/00 |
| | | | | 123/41.7 |
| 6,016,604 A | | 1/2000 | Wolf et al. | |
| 7,311,067 B2 | * | 12/2007 | Riehmann | ............. B24B 55/052 |
| | | | | 123/41.7 |
| 7,699,902 B2 | * | 4/2010 | Ohsawa | ................... F01P 11/12 |
| | | | | 30/59 |

(Continued)

FOREIGN PATENT DOCUMENTS

| | | |
|---|---|---|
| CN | 107175724 A | 9/2017 |
| DE | 196 31 033 A1 | 2/1998 |

(Continued)

*Primary Examiner* — Lucas E. A. Palmer
(74) *Attorney, Agent, or Firm* — Walter Ottesen, P.A.

(57) ABSTRACT

A work apparatus can be set down in a set-down position on
a horizontal plane. A side surface connects a cover to a base
and delimits the apparatus in the longitudinal direction in the
direction perpendicular to the tool plane. A filter component
is on the side surface and has a front half which with respect
to the longitudinal direction is arranged in front of a back
half of the filter's longitudinal extent. An imaginary tangen-
tial plane extends, in the set-down position, perpendicularly
to the horizontal plane, and is tangent to the side surface only
in the region of the filter's longitudinal extent only in the
region of the back half of the filter's longitudinal extent and
intersects the tool plane in front of the region of the filter's
longitudinal extent.

23 Claims, 10 Drawing Sheets

(56)            References Cited

U.S. PATENT DOCUMENTS

| | | | |
|---|---|---|---|
| D636,652 S * | 4/2011 | Mehra | D8/65 |
| D642,885 S * | 8/2011 | Sugishita | D8/65 |
| 11,000,933 B2 | 5/2021 | Ishikawa | |
| 11,058,982 B2 * | 7/2021 | Miura | B01D 46/0005 |
| D937,647 S * | 12/2021 | Kuang | D8/65 |
| 2003/0034004 A1 | 2/2003 | Leipelt et al. | |
| 2010/0122683 A1 * | 5/2010 | Kawana | F02B 63/02 |
| | | | 123/195 C |
| 2012/0066916 A1 | 3/2012 | Heinzelmann et al. | |
| 2015/0027745 A1 * | 1/2015 | Kurzenberger | B25F 5/006 |
| | | | 173/162.2 |
| 2017/0259452 A1 * | 9/2017 | Kachi | B25F 5/008 |
| 2018/0222011 A1 | 8/2018 | Eisenblaetter | |
| 2018/0319002 A1 * | 11/2018 | Esenwein | B25F 5/02 |
| 2018/0326337 A1 * | 11/2018 | Esenwein | B01D 46/0005 |
| 2020/0276694 A1 * | 9/2020 | Esenwein | B25F 5/008 |
| 2021/0046632 A1 * | 2/2021 | Osawa | B01D 46/0004 |
| 2021/0151814 A1 | 5/2021 | Heinzelmann et al. | |
| 2023/0090978 A1 * | 3/2023 | Arnell | B23D 45/16 |
| | | | 408/67 |
| 2025/0018547 A1 * | 1/2025 | Heinzelmann | B27B 17/00 |

FOREIGN PATENT DOCUMENTS

| | | | | |
|---|---|---|---|---|
| DE | 199 51 408 A1 | 5/2001 | | |
| DE | 10 2005 062 693 A1 | 7/2007 | | |
| DE | 10 2015 225 748 A1 | 6/2017 | | |
| DE | 10 2016 213 617 A1 | 6/2017 | | |
| DE | 10 2017 001 002 A1 | 8/2018 | | |
| DE | 202019104914 U1 * | 9/2019 | | B25F 5/02 |
| DE | 102021134362 A1 * | 6/2023 | | B25F 5/008 |
| EP | 2431132 A2 * | 3/2012 | | B23Q 11/14 |
| EP | 2 829 363 B1 | 2/2017 | | |
| EP | 2 747 949 B1 | 11/2017 | | |
| EP | 2 431 132 B1 | 7/2019 | | |
| EP | 3 389 940 B1 | 1/2021 | | |
| EP | 3 778 132 A1 | 2/2021 | | |
| EP | 3 778 133 A1 | 2/2021 | | |
| EP | 3 815 848 A1 | 5/2021 | | |
| EP | 3 825 065 A1 | 5/2021 | | |
| EP | 3 389 941 B1 | 4/2022 | | |
| EP | 4008477 A1 * | 6/2022 | | B25F 5/008 |
| JP | 2016-007680 A | 1/2016 | | |
| WO | 2019/061088 A1 | 4/2019 | | |
| WO | 2020/223186 A1 | 11/2020 | | |

* cited by examiner

HAND-GUIDED WORK APPARATUS

CROSS-REFERENCE TO RELATED APPLICATIONS

This application claims priority of German patent application nos. 10 2023 118 179.3, filed Jul. 10, 2023, 10 2023 118 171.8, filed Jul. 10, 2023, and 10 2023 118 186.6, filed Jul. 10, 2023, the entire contents of which are incorporated herein by reference.

BACKGROUND

DE 20 2019 104 914 U1 discloses a motorized chainsaw, in which the inlet opening for cooling air is provided at a side surface. The side surface extends approximately parallel with the work tool plane, in which the saw chain which is not illustrated revolves. So that there is sufficient space for the hand of a user between the bale handle and the air filter, the bale handle must be configured in a protruding manner. The work apparatus is thereby bulky and unwieldy. Particularly in the case of a felling cut, the inlet opening is orientated upward so that dirt can penetrate through the inlet opening inside the motorized chainsaw under the action of gravitational force.

SUMMARY

It is an object of the disclosure to further develop a work apparatus in such a manner that the work apparatus is configured in a compact and ergonomic manner.

This object is achieved by a hand-guided work apparatus including: a work tool; an operator-controlled handle; a motor configured to drive the work tool; the hand-guided work apparatus defining a longitudinal direction extending in a direction from the operator-controlled handle to the work tool; the work tool defining a work tool plane; an air filter component for filtering cooling air for cooling the motor; wherein the work apparatus is configured to be set down in a set-down position on a horizontal plane; the work apparatus having a base which faces the horizontal plane in the set-down position; a housing cover disposed opposite the base, wherein the work apparatus has a side surface which connects the housing cover and the base to each other and which delimits the work apparatus in a longitudinal direction in a direction perpendicular to the work tool plane; the air filter component being arranged on the side surface; the air filter component having a filter's longitudinal extent in the longitudinal direction; wherein an imaginary tangential plane, which extends in the set-down position perpendicularly to the horizontal plane, is tangent to the side surface only in a region of the filter's longitudinal extent; the imaginary tangential plane intersecting with the work tool plane; the filter's longitudinal extent including a front half and a back half with respect to the longitudinal direction, wherein the front half with respect to the longitudinal direction is arranged in front of the back half; wherein the imaginary tangential plane is tangent to the side surface in a region of the back half of the filter's longitudinal extent of the air filter component; and, the imaginary tangential plane intersecting with the work tool plane with respect to the longitudinal direction in front of a region of the filter's longitudinal extent.

It is a further object of the disclosure to further develop a work apparatus in such a manner that the introduction of dirt into the work apparatus is small with simultaneously good cooling of the work apparatus.

This object is achieved by a hand-guided work apparatus including: a work tool; an operator-controlled handle; a motor configured to drive the work tool; wherein the work apparatus defines a longitudinal direction extending in a direction from the operator-controlled handle to the work tool; an air filter component; the work apparatus defining an inlet space for introducing cooling air to be filtered by the air filter component into the work apparatus; the inlet space having at least one inlet opening for introducing the cooling air from outside into the work apparatus; the air filter component delimiting the inlet space; the inlet space delimiting a portion of a flow path for the cooling air; the flow path leading from the inlet opening to the motor; the inlet space having, along the flow path, flow cross sections which extend perpendicularly to the longitudinal direction for the cooling air; the inlet opening being arranged such that the cooling air is configured to flow in the longitudinal direction through the inlet opening; the air filter component delimiting the flow cross sections; and, the flow cross sections becoming smaller in the longitudinal direction of the work apparatus.

According to various embodiments, the air filter component is arranged at the side surface of the work apparatus. The air filter component has in the longitudinal direction a filter's longitudinal extent in which the air filter component extends. In particular, the region of the filter's longitudinal extent is delimited by a rear plane with respect to the longitudinal direction and by a front plane with respect to the filter's longitudinal extent. A notional tangential plane extends in the set-down position of the work apparatus perpendicularly to the horizontal plane. In the set-down position, the tangential plane is tangent to the side surface of the work apparatus, in particular an outer side of the side surface, only in the region of the filter's longitudinal extent. The tangential plane accordingly does not intersect with the side surface of the work apparatus in the region of the filter's longitudinal extent. However, the tangential plane can certainly intersect with other regions of the work apparatus, in particular other regions of the side surface.

The filter's longitudinal extent has with respect to the longitudinal direction a front half and a back half. The front half is arranged in front of the back half with respect to the longitudinal direction. In particular, the front half is further away from the operator-controlled handle than the back half with respect to the longitudinal direction.

According to the disclosure, the tangential plane is tangent to the side surface in the region of the back half. In particular, the tangential plane is not tangent to the side surface in the region of the front half of the filter's longitudinal extent. The tangential plane intersects with the work tool plane with respect to the longitudinal direction in front of the region of the filter's longitudinal extent, in particular in front of the filter component with respect to the longitudinal direction.

In particular, the work tool rotates in the work tool plane. In particular, the work tool plane and the tangential plane converge when viewed from the operator-controlled handle in the direction of the work tool.

As a result of the configuration according to the disclosure of the work apparatus, a compact and ergonomic configuration of the work apparatus is possible. In that the inlet space does not project beyond the tangential plane which extends acutely relative to the work tool plane, at the other side of the tangential plane in the region of the inlet space there is available structural space for other components of the work apparatus. At that location, for example, a bale handle can be arranged. The air filter component can be arranged laterally and can be engaged over by a bale handle and nevertheless the work apparatus can be configured in a compact and ergonomic manner. In the region of the back half of the filter's longitudinal extent, structural space is available inside a base body of the work apparatus. Here, for instance, a battery bay for a battery pack can be arranged.

Advantageously, the tangential plane defines with the work tool plane an angle of at least 1°, in particular of at least 3°. In particular, the air filter component is arranged within the range of this angle. Advantageously, the tangential plane defines with the work tool plane an angle of at most 45°, in particular at most 20°. An angular range within which the air filter component is arranged is delimited by the tangential plane and the work tool plane. The air filter component does not project out of this angular range. In particular, the side surface does not project out of this angular range in the region of the filter's longitudinal extent. A compact configuration of the work apparatus is thereby possible.

Advantageously, an outer side spacing of an outer side of the side surface from the work tool plane decreases in the region of the filter's longitudinal extent of the air filter component in the longitudinal direction. The outer side spacing is measured perpendicularly to the work tool plane. The outer side spacing is the distance of the outer side of the side surface from the work tool plane in the region of the filter's longitudinal extent of the air filter component. In particular, the outer side spacing changes in the longitudinal direction. The outer side spacing is accordingly not a spacing in the geometric sense, but instead a locally variable magnitude. In particular, the outer side spacing decreases in the longitudinal direction substantially continuously.

Advantageously, the work apparatus includes a bale handle. The bale handle has a bale portion which is located in the region of the filter's longitudinal extent and in the direction perpendicular to the work tool plane above the side surface. In particular, the bale portion is located at a first side of the work tool plane. The air filter component is also located at the first side of the work tool plane. In particular, the bale portion extends in the direction transverse relative to the direction which extends perpendicularly to the work tool plane. In particular, the longitudinal direction of the bale portion extends in the direction parallel with the work tool plane.

Advantageously, the outer side spacing with respect to the longitudinal direction is minimal in the region of the bale portion of the bale handle. It is thereby possible to provide sufficient space with respect to the longitudinal direction in the region of the bale portion for the user to engage around the bale handle. At the same time, the bale handle can be arranged so as to save structural space. The small outer side spacing in the region of the bale portion allows arrangement of the bale handle, in particular of the bale portion, so that the work apparatus is configured in a compact and ergonomic manner. It is thereby possible to reduce the pivot forces for the user to a smaller dimension so that the ergonomics of the work apparatus, in particular of a motorized saw, is improved.

The outer side of the side surface has a spacing region. The spacing region is located in the direction perpendicular to the work tool plane under the bale portion. In particular, the bale handle has in the bale portion a bale projection which is measured perpendicularly to the work tool plane above the spacing region. The bale portion of the bale handle projects by the bale projection above the outer side of the side surface in the region of the lateral surface which is located perpendicularly relative to the work tool plane under the bale portion. This region of the side surface is the spacing region. The bale projection is also referred to as the bale spacing. In particular, the bale projection is a geometric spacing and therefore indicates the length of the shortest "spacing line" which extends in the direction perpendicular to the work tool plane. The bale spacing is measured perpendicularly to the work tool plane. The bale spacing corresponds to the spacing, measured perpendicularly to the work tool plane, of the bale portion of the bale handle relative to the outer side of the side surface of the work apparatus, in particular relative to the region of the outer side of the side surface, which is located perpendicularly to the work tool plane under the bale portion, in particular relative to the spacing region.

The bale handle has in the bale portion a center of gravity spacing, measured perpendicularly to the work tool plane, from the mass center of gravity of the work apparatus. The center of gravity spacing is also a spacing in the geometric sense. Advantageously, the bale projection is from 20% to 60%, in particular from 30% to 50%, preferably from 35% to 45% of the center of gravity spacing. The bale handle, in particular the bale portion of the bale handle, can thereby be arranged near the mass center of gravity of the work apparatus. In that the outer side spacing with respect to the longitudinal direction is small in the region of the bale portion, in particular minimal, it is also possible to grip round the bale handle in the bale portion with a small ratio of the bale projection relative to the center of gravity spacing. This allows at the same time a compact configuration of the work apparatus and ergonomic guiding and carrying of the hand-guided work apparatus via the bale handle. Since the bale handle is near the mass center of gravity, the lever forces are small for guiding and carrying the work apparatus via the bale handle. In particular, the center of gravity spacing is from 9 cm to 15 cm, advantageously from 11 cm to 13 cm. There may also be provision for the center of gravity spacing to be from 8 cm to 12 cm, in particular from 9 cm to 11 cm.

In a further embodiment of the disclosure, the work apparatus includes an inlet space for introducing cooling air, which is intended to be filtered by the air filter component, into the work apparatus. However, there may also be provision for a configuration of the work apparatus without any inlet space. The inlet space is advantageously delimited by the side surface, in particular by an inner side of the side surface. In particular, the inlet space extends with respect to the longitudinal direction at least also in the region of the filter's longitudinal extent. Advantageously, the tangential plane is tangent to the side surface in the region of the back half of the filter's longitudinal extent in a region of the side surface which delimits the inlet space. In particular, the tangential plane is tangent to the outer side of a region of the side surface, the inner side of which directly delimits the inlet space. Advantageously, the inlet space has an inlet opening, through which cooling air can flow from outside into the inlet space in the longitudinal direction.

In that the cooling air flows in the longitudinal direction through the inlet opening, the work apparatus can be configured so that openings for the introduction of cooling air directly from the outer side into the work apparatus in the direction perpendicular to a work tool plane of the work apparatus are present only to a small extent or not at all. In particular, the inlet opening can be configured so that it opens primarily in the direction counter to the longitudinal direction. Advantageously, the proportion of the surface-area of the inlet opening which is visible as a side view perpendicular to the work tool plane of the work apparatus can be configured to be very small. Only very little cut material can thereby penetrate from the work tool to the inlet opening and be introduced into the work apparatus. The work tool is particularly arranged at the front end in the longitudinal direction of the hand-guided work apparatus. Since the inlet opening opens in the direction toward the rear end of the work apparatus with respect to the longitudinal direction, the introduction of dirt which is generated by the work tool during the use of the hand-guided work apparatus into the work apparatus through the inlet opening for cooling air is small. Particularly in the event of a felling cut, only a small quantity of dirt particles on which gravitational force acts can be introduced into the work apparatus through the inlet opening for cooling air. In this manner, the introduction of dirt through the inlet opening for cooling air is very small.

In a further embodiment of the disclosure, the work apparatus has a filter cover. However, a configuration of the work apparatus without any filter cover can also be provided. In particular, the inlet opening for cooling air is formed in the filter cover.

A simple production of the inlet opening is thereby possible. In particular, the filter cover can cover an opening of the work apparatus in the portion in which it does not have any inlet opening, in, on or at which the filter is arranged. Advantageously, the filter cover forms a portion of the outer wall. Advantageously, the filter cover forms a portion of the side surface, in particular in the region of the filter's longitudinal extent. Advantageously, the tangential plane is tangent to the side surface in the region of the back half of the filter's longitudinal extent in a region of the side surface which is formed by the filter cover. In particular, the tangential plane is tangent to the filter cover, in particular the outer side of the filter cover, in the region of the back half of the filter's longitudinal extent of the air filter component.

Advantageously, the inlet opening, in particular an opening of an interior space of the work apparatus, is arranged at the side surface of the work apparatus. The inlet opening is thereby accessible in a simple manner. It is thereby possible to configure the inlet opening, in particular the surface-area of the air filter, to be large. The side surface of the work apparatus provides sufficient space for this.

Advantageously, the filter cover is substantially wedge-shaped in a view perpendicular to the horizontal plane in the set-down position.

Advantageously, the filter cover is used to retain the air filter component. In particular, the filter cover covers the air filter component at least partially, advantageously completely as a side view in the direction perpendicular to the first side of the work tool plane. Advantageously, the air filter component is retained between the filter cover and the base body of the work apparatus.

In particular, the air filter component is retained with play between the filter cover and the base body of the work apparatus. Simple production of the work apparatus is thereby possible. The filter cover can be pressed against the base body and bear against the base body without the air filter component having to be considered to this end in the case of the production tolerances. In that the filter cover can be pressed against the base body, small demands can be placed on the production tolerances with respect to the relative position of the base body and the filter cover and nevertheless the filter cover can bear against the base body in a reliably fluid-tight manner.

Advantageously, the filter cover and/or the air filter component can be fastened to the base body by a single fastening element. The filter cover and/or the air filter component can thereby bear against the base body in a fluid-tight manner, in particular air-tight manner. In particular, the single fastening element is a central fastening element. Advantageously, the fastening element can be fastened in the side view perpendicular to the work tool plane, in particular in the direction toward the first side of the work tool plane, approximately at the center of the filter cover, in particular in the center of the area of the planar surface associated with the filter outer contour. In that the filter cover and/or the air filter component can be fastened by a single fastening element, the filter cover and/or the air filter component can be assembled and disassembled in a simple and comfortable manner. The air filter component can be disassembled rapidly and is accessible in a simple manner, for example, for cleaning purposes.

Advantageously, the fastening element connects the base body of the work apparatus and the filter cover to each other. In particular, in the region of the fastening element, a first stop region for the air filter component is arranged on the base body. Advantageously, a second stop region for the air filter component is arranged on the filter cover. In particular, the air filter component is retained with play in the direction from the first stop region to the second stop region between the first stop region and the second stop region. It is thereby possible to reliably retain the filter cover even with small demands on the production tolerances and at the same time the filter cover can be pressed tightly against the base body.

In a further embodiment of the disclosure, the work apparatus has a receiving bay for a battery pack. The battery pack can be inserted into the receiving bay in an insertion direction through a receiving opening of the receiving bay. In particular, the insertion direction extends parallel with the work tool plane. In particular, the receiving bay is arranged in the region of the filter's longitudinal extent with respect to the longitudinal direction. Advantageously, the receiving bay is arranged in the region of the back half of the filter's longitudinal extent with respect to the longitudinal direction. Since the tangential planes of the side surface are tangent according to the disclosure in the region of the back half and as a result of the intersection of the work tool plane by the tangential plane with respect to the longitudinal direction in front of the filter's longitudinal extent, in the region of the back half of the filter's longitudinal extent there is sufficient space for the receiving bay. At the same time, in the region of the front half of the filter's longitudinal extent outside the base body of the work apparatus there is sufficient space for arranging a handle space, in which the user can grip with the fingers of his/her hand. The bale portion can be arranged near the base body, whereby the work apparatus can also be configured in a compact and ergonomic manner with a large battery bay.

The receiving bay has a depth measured in the longitudinal direction and a width measured perpendicularly to the work tool plane. In particular, the width is greater than the depth. In particular, the width is at least 50%, in particular at least 60%, of a maximum width, measured in the direction perpendicular to the work tool plane, of the base body of the work apparatus. In particular, the base body of the work apparatus has the maximum width in the back half of the filter's longitudinal extent. A large battery pack can thereby be accommodated in the receiving bay.

There can advantageously be provision for a notional projection of the air filter component in the direction perpendicular to the work tool plane onto the work tool plane and a notional projection of the receiving bay in the direction perpendicular to the work tool plane onto the work tool plane to overlap in the work tool plane.

Advantageously, the side surface is free from the receiving opening of a receiving bay for a battery. It is thereby possible to configure the air filter component, in particular the filter surface of the air filter component, to be particularly great. No space has to be provided at the side surface for a receiving opening of a receiving bay.

The inlet space delimits a portion of a flow path for the cooling air. The flow path for cooling air extends from the inlet opening to the motor of the hand-guided work apparatus for driving the work tool. In particular, the flow path leads through the inlet space. The inlet space has flow cross sections for the cooling air along the flow path. In particular, the cooling air passes the flow cross sections when flowing through the inlet space. The flow cross sections extend perpendicularly to the longitudinal direction, in particular in planes. In particular, the flow cross sections extend transversely relative to the flow path.

In particular, the air filter component delimits all the flow cross sections. This causes the cooling air to flow along the filter surface of the air filter component. The work apparatus can then be configured so that the introduction into a clean air chamber of the work apparatus, in particular into the interior space of a housing of the base body of the work apparatus, takes place while the cooling air after being introduced into the work apparatus through the inlet opening in the longitudinal direction flows along at the outer side of the clean air chamber, in particular of the interior space, in particular at an opening of the clean air chamber, in particular of the interior space, in particular flows along in the inlet space. During this flow, successive cooling air can be introduced into the clean air chamber, in particular the interior space of the housing, from an opening, which extends in the longitudinal direction, of the inlet space, in, at or on which the air filter component is arranged, so that the volume of cooling air which has not yet been introduced into the clean air chamber, in particular the interior space, decreases during the flow in the longitudinal direction. Therefore, the volume flow of the cooling air in the longitudinal direction decreases. This results in the problem that the flow stream, in particular the volume flow, is non-uniform. Without any additional measure, the flow stream, in particular the volume flow, decreases along the flow path at a greater distance from the inlet opening, in particular before being introduced into the clean air chamber, in particular the interior space of the housing. In order nevertheless to achieve a good, uniform cooling action, there may be provision for the flow cross sections of the inlet space to become smaller in the longitudinal direction. It is thereby possible to achieve a uniform flow stream, in particular a uniform volume flow. A good, uniform cooling action is thereby achieved. The entire filter surface is thereby clogged in a uniform manner. This increases the service life of the air filter.

There can advantageously be provision for the flow cross sections to continuously become smaller in the direction of the flow path.

In a further embodiment of the disclosure, the inlet space extends from the inlet opening in the longitudinal direction. The effect of the uniform flow stream thereby already occurs after the cooling air enters through the inlet opening. Advantageously, the inlet space is delimited at least at one side by an outer wall of the work apparatus. In particular, the inner side of the outer wall delimits the inlet space.

In a further embodiment, the work apparatus is configured in such a manner that the cooling air flows in the inlet space along a filter surface of the air filter component. In particular, the work apparatus is configured in such a manner that the cooling air, while flowing along the filter surface, is gradually introduced through the air filter component into a clean air chamber of the work apparatus.

By decreasing the outer side spacing in the longitudinal direction, the reduction of the flow cross-sections of the inlet space can be brought about in a simple manner.

In particular, the filter cover delimits the inlet space. As a result of the above-described wedge shape of the filter cover, the reduction of the flow cross sections of the inlet space in the longitudinal direction can be implemented in a simple manner. In particular, the inlet space is formed by the filter cover and the air filter component. In particular, the inlet space has the inlet opening for cooling air at one end thereof. Advantageously, the other end of the inlet space for the discharge of cooling air into the interior space of the work apparatus is completely formed by the air filter component, in particular completely covered by the air filter component.

The work apparatus has an upward direction. The upward direction extends in the direction transverse, in particular perpendicular to the longitudinal direction. The upward direction extends particularly in the direction parallel with the work tool plane. If the work apparatus is set down on the horizontal plane in the set-down position provided for it, the upward direction advantageously extends perpendicularly to the horizontal plane. The upward direction extends particularly in the direction of the base of the work apparatus toward the housing cover of the work apparatus.

There may be provision for the air filter component to be inclined at an angle of at least 5°, in particular of a maximum of 40°, with respect to the upward direction, in particular with respect to the work tool plane. Advantageously, the air filter component substantially extends in a plane. In particular, the spacing of the air filter component increases relative to the work tool plane in an upward direction. This spacing is a local spacing of individual points of the air filter component relative to the work tool plane. Such an inclined arrangement of the air filter component improves the self-cleaning action thereof.

In order to achieve the additional object, there is provision for the inlet space to have at least one inlet opening for the introduction of cooling air into the work apparatus. The air filter component delimits the inlet space. The inlet space delimits a portion of a flow path for the cooling air. The flow path for cooling air extends from the inlet opening to the motor of the hand-guided work apparatus for driving the work tool. In particular, the flow path leads through the inlet space. The inlet space has along the flow path flow cross sections for the cooling air. In particular, the cooling air passes the flow cross sections when flowing through the inlet space. The flow cross sections extend perpendicularly to the longitudinal direction, in particular in planes. In particular, the flow cross-sections extend transversely relative to the flow path.

According to various embodiments of the disclosure, the inlet opening is arranged in such a manner that cooling air can flow in the longitudinal direction through the inlet opening. In that the cooling air flows in the longitudinal direction through the inlet opening, the work apparatus can be configured so that openings for the introduction of cooling air into the work apparatus in the direction perpendicular to a work tool plane of the work apparatus are not present at all or are present only to a small extent. In particular, the work tool revolves in the work tool plane. In particular, the inlet opening can be configured so that it opens mainly in the direction counter to the longitudinal direction. Advantageously, the proportion of the surface-area of the inlet opening which is visible as a side view, in particular in the direction toward a first side of the work tool plane, on which the air filter component is also arranged, perpendicularly to the work tool plane of the work apparatus can be configured to be very small. It is thereby possible for only a very small amount of cut material to penetrate from the work tool to the inlet opening and to be introduced into the work apparatus. The work tool is particularly arranged at the front end, in the longitudinal direction, of the hand-guided work apparatus. Since the inlet opening opens in the direction toward the rear end, with respect to the longitudinal direction, of the work apparatus, the introduction of dirt, which is generated by the work tool during the use of the hand-guided work apparatus, into the work apparatus through the inlet opening for cooling air is small. In particular in the case of a felling cut, only a small amount of dust particles, on which gravitational force acts, can be introduced through the inlet opening for cooling air into the work apparatus. In this manner, the introduction of dirt through the inlet opening for cooling air is very small.

The air filter component further delimits all the flow cross sections. This causes the cooling air to flow along a filter surface of the air filter component. The work apparatus can then be configured so that the introduction is carried out into a clean air chamber, in particular an interior space of a housing of the work apparatus, while the cooling air after being introduced into the work apparatus flows through the inlet opening in the longitudinal direction along the outer side of the clean air chamber, in particular along the outer side of the interior space, in particular along an opening of the interior space, in particular along the air filter component, in particular flows along in the interior space. During this flowing action, successive cooling air can be introduced into the interior space of the housing from an opening, which extends in the longitudinal direction, of the inlet space, in, at or on which the air filter component is arranged, so that the volume of the cooling air which has not yet been introduced into the interior space decreases during the flowing action in the longitudinal direction. Therefore, the volume flow of the cooling air in the longitudinal direction decreases. This thereby results in the problem that the flow stream, in particular the volume flow, is non-uniform. Without any additional measure, the flow stream, in particular the volume flow, decreases along the flow path with a greater distance from the inlet opening, in particular before being introduced into the clean air chamber, in particular before being introduced into the interior space of the housing. In order nevertheless to achieve a good, uniform cooling action, there is provision according to the disclosure for the flow cross sections of the inlet space to become smaller in the longitudinal direction. A uniform flow stream, in particular a uniform volume flow, can thereby be achieved. A good, uniform cooling action is thereby achieved. The entire filter surface of the air filter component is thereby clogged in a uniform manner. This increases the service life of the air filter component.

There can advantageously be provision for the flow cross sections to become continuously smaller in the direction of the flow path.

In a further embodiment of the disclosure, the inlet space extends from the inlet opening in the longitudinal direction. The effect of the uniform flow stream thereby already takes effect after the cooling air is introduced through the inlet opening.

Advantageously, the inlet space is delimited at least at one side by an outer wall of the work apparatus. In particular, the inner side of the outer wall delimits the inlet space. Advantageously, the flow cross sections are delimited by the outer wall of the work apparatus.

In a further embodiment, the work apparatus is configured so that the cooling air flows in the inlet space along a filter surface of the air filter component. In particular, the work apparatus is configured so that the cooling air is introduced into a clean air chamber of the work apparatus gradually during the flow along the filter surface through the air filter component.

Advantageously, the work apparatus has a base. The base faces the horizontal plane in the set-down position. In particular, the work apparatus has a housing cover opposite the base. In particular, the work apparatus has a side surface. The side surface connects the housing cover and the base to each other. The side surface delimits the work apparatus in the longitudinal direction in the direction perpendicular to the work tool plane. Advantageously, the inlet space, in particular the inlet opening, is arranged at the side face of the work apparatus. The inlet space, in particular the inlet opening, is thereby accessible in a simple manner. The inlet opening, in particular the surface of the air filter, can thereby be configured to be great. The side surface of the work apparatus provides sufficient space for this. The inlet space is advantageously delimited by the side surface, in particular by an inner side of the side surface.

Advantageously, the work apparatus includes a bale handle. The bale handle has a bale portion which is located in the direction perpendicular to the work tool plane above the inlet space. In particular, the bale portion extends in the direction transverse to the direction which extends perpendicularly to the work tool plane. In particular, the longitudinal direction of the bale portion extends in the direction parallel with the work tool plane. In particular, the bale portion is located at a first side of the work tool plane, at which the inlet space is also located.

Advantageously, an outer side spacing of an outer side of the side surface decreases relative to the work tool plane in the region of the inlet space in the longitudinal direction. The outer side spacing is measured perpendicularly to the work tool plane. The outer side spacing is the distance of the outer side of the side surface from the work tool plane in the region of the filter's longitudinal extent of the air filter component. In particular, the outer side spacing changes in the longitudinal direction. The outer side spacing is accordingly not a spacing in the geometric sense, but instead a locally variable magnitude. In particular, the outer side spacing decreases from the inlet opening through which cooling air can flow from the exterior in the longitudinal direction into the inlet space in the longitudinal direction as far as the bale portion. In particular, the outer side spacing decreases in the longitudinal direction, in particular from the inlet opening as far as the bale portion, substantially continuously. As a result of the decrease of the outer side spacing in the longitudinal direction, the reduction of the flow cross sections of the inlet space can be brought about in a simple manner.

Advantageously, the outer side spacing is minimal with respect to the longitudinal direction in the region of the bale portion of the bale handle. It is thereby possible to provide sufficient space, with respect to the longitudinal direction in the region of the bale portion, for a user to grip round the bale handle. At the same time, the bale handle can be arranged so as to save structural space. The small outer side spacing in the region of the bale portion allows arrangement of the bale handle, in particular of the bale portion, so that the work apparatus is configured in a compact and ergonomic manner. It is thereby possible for the pivot forces for the user to be reduced to a smaller amount so that the ergonomics of the work apparatus, in particular a motorized saw, is improved.

The outer side of the side surface has a spacing region. The spacing region is located in the direction perpendicular to the work tool plane under the bale portion. In particular, the bale handle has in the bale portion a bale projection, measured perpendicularly to the work tool plane, above the spacing region. The bale portion of the bale handle projects by the bale projection above the outer side of the side surface in the region of the side surface which is located perpendicularly to the work tool plane under the bale portion. This region of the side surface is the spacing region. The bale projection is also referred to as the bale spacing. In particular, the bale projection is a geometric spacing, therefore it indicates the length of the shortest "spacing line" which extends in the direction perpendicular to the work tool plane. The bale spacing is measured perpendicularly to the work tool plane. The bale spacing corresponds to the spacing, measured perpendicularly to the work tool plane, of the bale portion of the bale handle relative to the outer side of the side surface of the work apparatus, in particular relative to the region of the outer side of the side surface which is perpendicular to the work tool plane under the bale portion, in particular relative to the spacing region.

The bale handle has in the bale portion a center of gravity spacing which is measured perpendicularly to the work tool plane relative to the mass center of gravity of the work apparatus. The center of gravity spacing is a spacing in the geometric sense. Advantageously, the bale projection is from 20% to 60%, in particular from 30% to 50%, preferably from 35% to 45% of the center of gravity spacing. It is thereby possible for the bale handle, in particular the bale portion of the bale handle, to be arranged near the mass center of gravity of the work apparatus. In that the outer side spacing is small, in particular minimal, with respect to the longitudinal direction in the region of the bale portion, it is also possible to grip round the bale handle in the bale portion with a small ratio of the bale projection to the center of gravity spacing. At the same time, this allows a compact configuration of the work apparatus and an ergonomic guiding and carrying of the hand-guided work apparatus via the bale handle. Since the bale handle is near the mass center of gravity, the lever forces for guiding and carrying the work apparatus via the bale handle are small. In particular, the center of gravity spacing is from 9 cm to 15 cm, advantageously from 11 cm to 13 cm. There may also be provision for the center of gravity spacing to be from 8 cm to 12 cm, in particular from 9 cm to 11 cm.

In a further embodiment of the disclosure, the work apparatus has a filter cover. However, there may also be provided a configuration of the work apparatus without any filter cover. Advantageously, the inlet space is delimited by the filter cover. In particular, the inlet opening for cooling air is configured in the filter cover. A simple production of the inlet opening is thereby possible. In particular, the filter cover can cover an opening of the work apparatus, in the portion in which it does not have any inlet opening, in, on or at which the air filter component is arranged. Advantageously, the filter cover forms a portion of the outer wall. Advantageously, the filter cover forms a portion of the side surface.

Advantageously, the filter cover can be substantially wedge-shaped when viewed perpendicularly to the horizontal plane in the set-down position. This allows simple production of the reduction of the flow cross sections in the longitudinal direction.

Advantageously, the filter cover can serve to retain the air filter component. In particular, the filter cover at least partially covers the air filter component, advantageously completely as a side view in the direction perpendicular to the first side of the work tool plane. Advantageously, the air filter component is retained between the filter cover and the base body of the work apparatus.

In particular, the air filter component is retained with play between the filter cover and the base body of the work apparatus. It is thereby possible to produce the work apparatus in a simple manner. The filter cover can be pressed against the base body and bear against the base body without the air filter component having to be considered to this end in the case of the production tolerances. In that the filter cover can be pressed against the base body, small demands can be placed on the production tolerances with respect to the relative position of the base body and filter cover and nevertheless the filter cover can bear against the base body in a reliably fluid-tight manner.

Advantageously, the filter cover and/or the air filter component can be fastened by a single fastening element to the base body. The filter cover and/or the air filter component can thereby bear against the base body in a fluid-tight manner, in particular in an air-tight manner. In particular, the single fastening element is a central fastening element. Advantageously, the fastening element can be fastened, in the side view perpendicular to the work tool plane, in particular toward the first side of the work tool plane, approximately at the center of the filter cover, in particular in the center of an area of the planar surface, which is associated with the filter outer contour. In that the filter cover and/or the air filter component can be fastened by a single fastening element, the filter cover and/or the air filter component can be assembled and disassembled in a simple and comfortable manner. The air filter component can be disassembled rapidly and is accessible in a simple manner, for example, for cleaning purposes.

Advantageously, the fastening element connects the base body of the work apparatus and the filter cover to each other. In particular, a first stop region for the air filter component is arranged on the base body in the region of the fastening element. Advantageously, a second stop region for the air filter region is arranged on the filter cover. In particular, the air filter component is retained with play in the direction from the first stop region to the second stop region between the first stop region and the second stop region. It is thereby possible to retain the filter cover reliably even with small demands placed on the production tolerances and, at the same time, the filter cover can be pressed against the base body in a fluid-tight manner.

In a further embodiment of the disclosure, the work apparatus has a receiving bay for a battery pack. The battery pack can be inserted into the receiving bay in an insertion direction through a receiving opening of the receiving bay. In particular, the insertion direction extends parallel with the work tool plane. In particular, the receiving bay is arranged with respect to the longitudinal direction in the region of the inlet space. As a result of the wedge-shaped configuration of the inlet space, in particular of the filter cover, there is sufficient space for the receiving bay in the rear region with respect to the longitudinal direction, in particular in the back half of the inlet space. At the same time, there is sufficient space in the region of the front half, with respect to the longitudinal extent, of the inlet space outside the base body of the work apparatus for arranging a gripping space, in which the user can grip with his/her fingers of his/her hand. The bale portion can be arranged near the base body, whereby the work apparatus can also be configured in a compact and ergonomic manner with a large battery bay.

The receiving bay has a depth which is measured in the longitudinal direction and a width which is measured perpendicularly to the work tool plane. In particular, the width is greater than the depth. In particular, the width is at least 50%, in particular at least 60%, of a maximum width, measured in the direction perpendicular to the work tool plane, of the base body of the work apparatus. In particular, the base body of the work apparatus has the maximum width in the back half, with respect to the longitudinal direction, of the inlet space. It is thereby possible to accommodate a large battery pack in the battery bay.

There can advantageously be provision for a notional projection of the inlet space in the direction perpendicular to the work tool plane onto the work tool plane and a notional projection of the receiving bay in the direction perpendicular to the work tool plane onto the work tool plane to overlap in the work tool plane.

Advantageously, the side surface is free from the receiving opening of a receiving bay for a battery. It is thereby possible for the air filter component, in particular the filter surface of the air filter component, to be configured to be particularly great. Space does not have to be provided at the side surface for a receiving opening of a receiving bay.

In particular, the filter cover delimits the inlet space. As a result of the above-described wedge shape of the filter cover, the reduction of the flow cross sections of the inlet space in the longitudinal direction can be implemented in a simple manner. In particular, the inlet space is formed by the filter cover and the air filter component. In particular, the inlet space has at one end thereof the inlet opening for cooling air. Advantageously, the other end of the inlet space for the discharge of cooling air into the clean air chamber of the work apparatus, in particular into the interior space of the work apparatus, is completely formed by the air filter component, in particular completely covered by the air filter component.

The work apparatus has an upward direction. The upward direction extends in the direction transverse, in particular perpendicular, to the longitudinal direction. The upward direction extends in particular in the direction parallel with the work tool plane. If the work apparatus is set down on the horizontal plane in the set-down position provided therefor, the upward direction advantageously extends perpendicularly to the horizontal plane. The upward direction extends in particular in the direction from the base of the work apparatus toward the housing cover of the work apparatus.

There may be provision for the air filter component to be inclined at an angle of at least 5°, in particular of a maximum of 40°, with respect to the upward direction, in particular with respect to the work tool plane. Advantageously, the air filter component extends substantially in a plane. In particular, the spacing of the air filter component from the work tool plane increases in an upward direction. This spacing is a local spacing of individual points of the air filter component from the work tool plane. Such an inclined arrangement of the air filter component improves the self-cleaning action thereof.

BRIEF DESCRIPTION OF DRAWINGS

The invention will now be described with reference to the drawings wherein.

DETAILED DESCRIPTION

Figure 1:
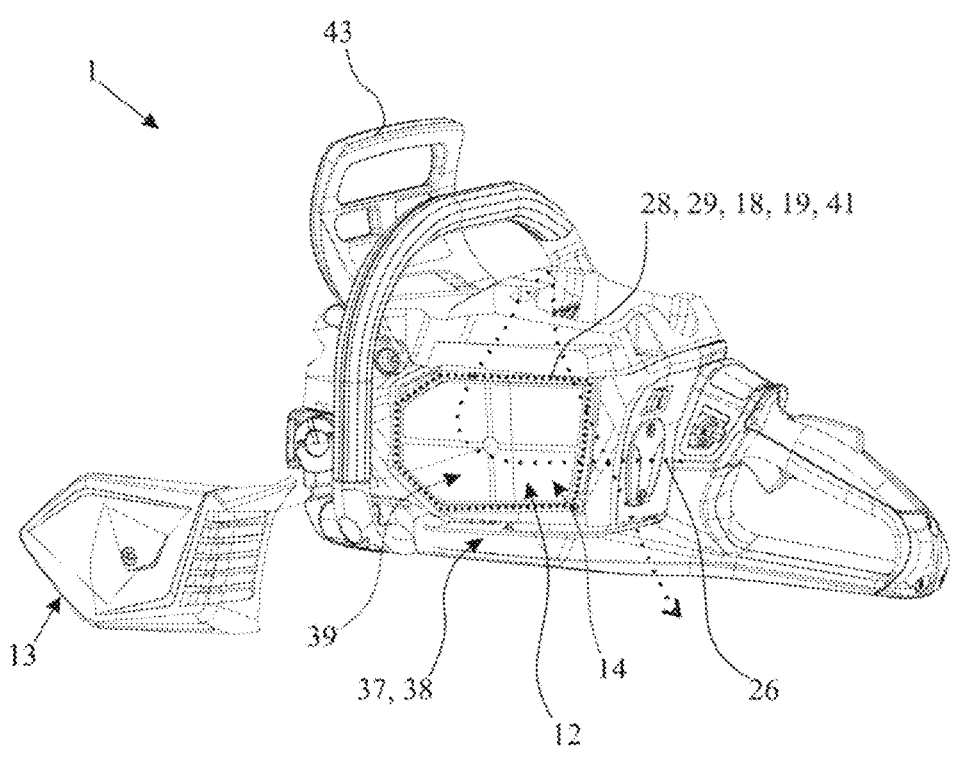
FIG. 1 shows a perspective illustration of a hand-guided work apparatus without a work tool, wherein the filter cover is illustrated in the manner of an exploded illustration in a state remote from the base body of the work apparatus.
Figure 2:
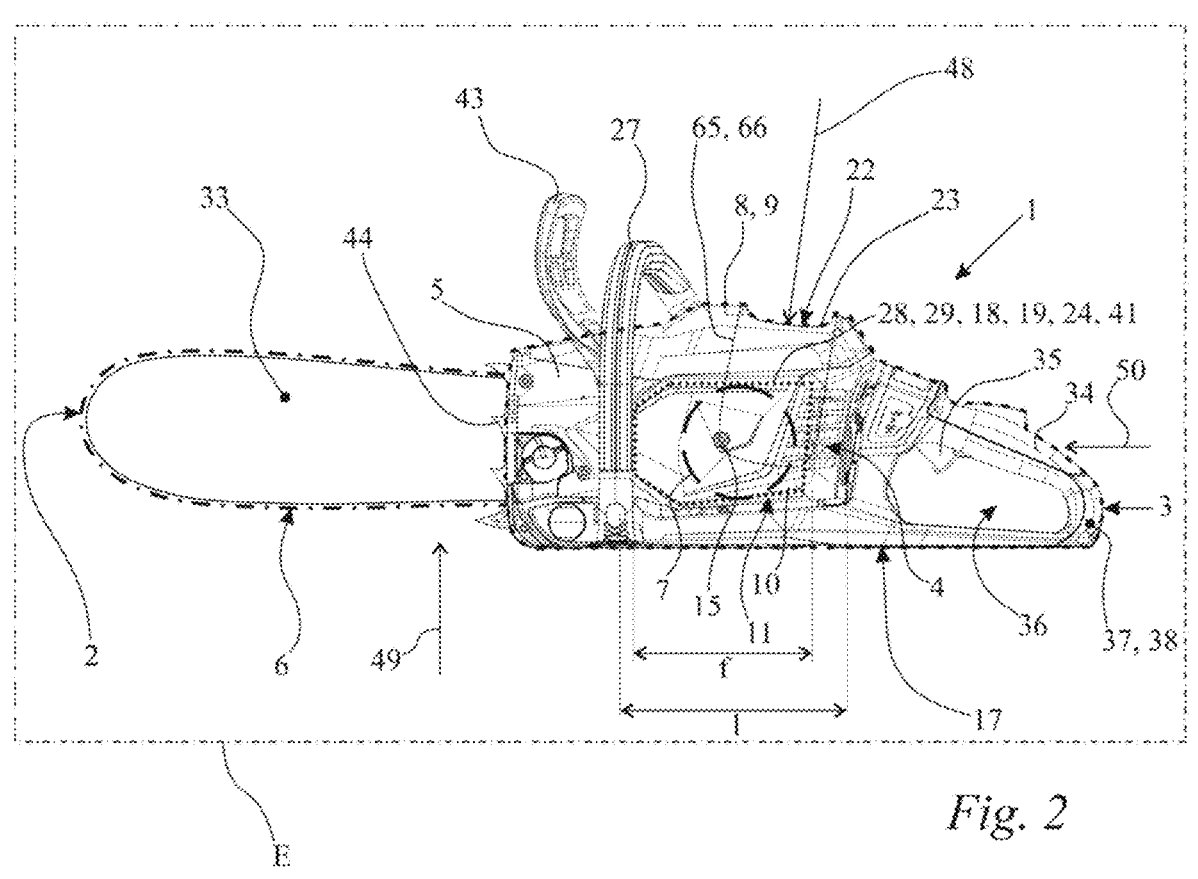
FIG. 2 shows a schematic side view of the work apparatus from FIG. 1 with a work tool and with a viewing direction perpendicular to the first side of the work tool plane of the work tool, on which the air filter component is also arranged.

FIG. 1 shows a hand-guided work apparatus 1. The hand-guided work apparatus 1 includes a work tool 6 which is illustrated in FIG. 2 (not illustrated in FIG. 1). The hand-guided work apparatus 1 is a motorized chainsaw, an abrasive cutter or a similar hand-guided work apparatus. The work apparatus 1 can be carried during correct use. The work apparatus 1 is guided by hand during correct use. In the embodiments, the work apparatus 1 is a motorized chainsaw. In the embodiments, the motorized chainsaw is a so-called rear handle chainsaw or tree-felling saw. However, it may also be a tree-pruning saw with a top operating handle.

As schematically illustrated in FIG. 2, the hand-guided work apparatus 1 includes a motor 7 for driving the work tool 6. In the embodiments, the motor 7 is an electric motor. The work tool 6 is a saw chain. However, there may also be provision, particularly in the event that the work apparatus is an abrasive cutter, for the work tool 6 to be a saw blade or a separation disk. In the embodiments, the work tool 6 revolves during operation about a guide bar 33.

The work apparatus 1 includes in all the embodiments an operator-controlled handle 34. An operating element 35 is arranged on the operator-controlled handle 34. Via the operating element 35, the operator can predetermine the power of the motor 7 or the speed of the motor 7 or the work tool 6. The operator-controlled handle 34 delimits a handle opening 36. Through the handle opening 36, the user can grip with the fingers of his/her hand and thus enclose the operator-controlled handle 34. The handle opening 36 completely extends through the work apparatus 1, in particular a base body 37 of the work apparatus 1. In addition to the operator-controlled handle 34, the work apparatus 1 includes in all the embodiments a bale handle 27. The bale handle 27 serves to carry and guide the work apparatus 1. The bale handle 27 is formed by a handle tube. The user can completely grip round the handle tube.

The bale handle 27 is arranged between the operator-controlled handle 34 and the work tool 6. A longitudinal direction 50 extends in the direction from the operator-controlled handle 34 toward the work tool 6. This also applies in the case of a tree-pruning saw. The longitudinal direction 50 extends parallel with a horizontal plane if the work apparatus 1 is set down on the horizontal plane. The longitudinal direction 50 corresponds in the embodiment to the longitudinal direction of the guide bar 33. The bale handle 27 is arranged between the operator-controlled handle 34 and the work tool 6 with respect to the longitudinal direction 50. The operator-controlled handle 34 is located behind the work tool 6 with respect to the longitudinal direction 50. The work tool 6 is located in front of the operator-controlled handle 34 with respect to the longitudinal direction 50.

If initially one start point is arranged along the longitudinal direction 50 then a first point and then a second point, that is, the second point starting from the start point has in the longitudinal direction 50 a greater spacing, measured in the longitudinal direction 50, from the start point than the first point, then the second point is located in front of the first point with respect to the longitudinal direction 50. The first point is located behind the second point with respect to the longitudinal direction 50.

The work apparatus 1 has a front end 2 and a rear end 3. The front end 2 faces away from the user during operation of the work apparatus 1. The rear end 3 faces the user during operation of the work apparatus 1. The work tool 6 is arranged at the front end 2. In the embodiment, the front end 2 is located at the front end of the guide bar 33. The work tool 6, which revolves about the guide bar 33, passes during the revolution the front end 2 of the work apparatus 1. The rear end 3 is arranged at the rear end of the operator-controlled handle 34. The operator-controlled handle 34 forms the rear end 3 of the work apparatus 1. A longitudinal direction 50 extends in the direction from the rear end 3 to the front end 2. The longitudinal direction 50 is directed during use of the work apparatus 1 away from the user. The longitudinal direction 50 corresponds in the embodiment to the longitudinal direction of the guide bar 33. The bale handle 27 is arranged between the front end 2 and the rear end 3 with respect to the longitudinal direction 50.

The work apparatus 1 can be set down on a horizontal plane, in particular in a set-down position. The work apparatus 1 includes a base 17. In the embodiments, the work apparatus 1 can be set down on its base 17. The base 17 forms a set-down surface. However, there may also be provision for the work apparatus to be able to be set down on feet and for a spacing to be present between the base 17 and the horizontal plane. In any case, the base 17 faces the horizontal plane in the set-down position. The set-down position is also referred to as the set-down state. When the work apparatus 1 is set down on the horizontal plane, the longitudinal direction 50 extends parallel with the horizontal plane. In the embodiments, the longitudinal direction 50 extends parallel with the set-down surface formed by the base 17.

Figure 2A:
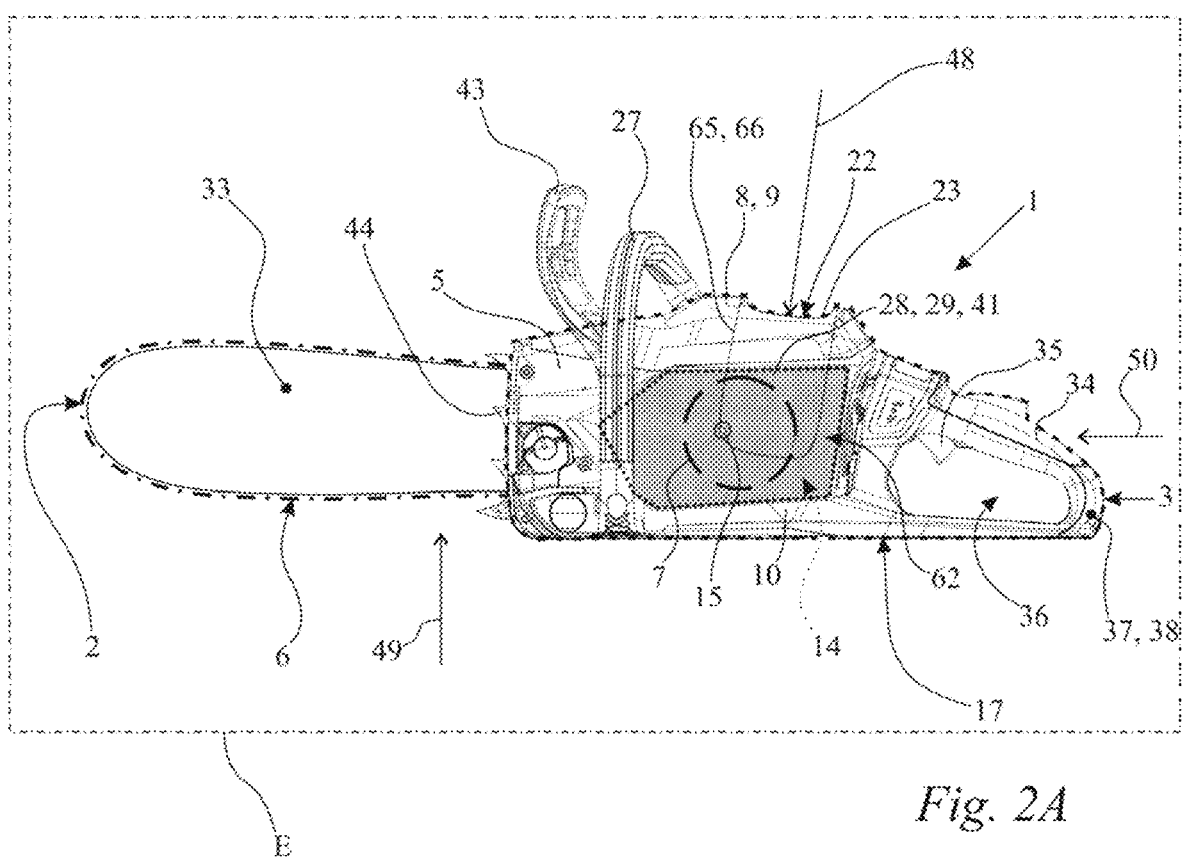
FIG. 2A shows a schematic side view of an alternative embodiment of the work apparatus from FIG. 1 in which the air filter component is open at the first side surface without being covered by a filter cover, wherein the work apparatus is illustrated with a work tool and in the viewing direction perpendicular to the first side of the work tool plane of the work tool, on which the air filter component is also arranged.

As illustrated in FIG. 2, the work apparatus 1 includes an inlet opening 4. The inlet opening 4 serves to introduce cooling air into the work apparatus 1. The cooling air is provided for cooling the motor 7, which is in the form of an electric motor, in particular for cooling the electronic components of the electric motor. The work apparatus 1 includes an air filter component 12 for filtering the cooling air. The air filter component 12 is illustrated in FIG. 1. FIG. 2A shows an alternative embodiment with an alternatively configured air filter component 12. In the embodiments, the air filter component 12 includes a filter frame and an air filter. The air filter is in particular retained in the filter frame. The air filter is the unit which brings about per se the filtering of the air. In the embodiments, the air filter of the air filter component 12 is a fine filter. The fine filter has a mesh width less than 100 μm. In embodiments, the air filter of the air filter component 12 is a flat filter. However, the air filter of the air filter component may also be any other type of air filter. The air filter component 12 may also exclusively include an air filter. There may also be provision for the air filter component not to include a filter frame.

The work apparatus 1 includes a housing 5. The motor 7 is arranged in the housing 5. The housing 5 delimits the work apparatus 1 in an outward direction. The motor 7 is arranged in the embodiment in the base body 37 of the work apparatus 1. The base body 37 has a base housing 38 which is also illustrated in FIG. 1. The motor 7 is arranged in the base housing 38 of the base body 37. The housing 5 is at least partially formed by the base housing 38. The bale handle 27 engages over the housing 5. The bale handle 27 engages over the base body 37. The bale handle 27 engages over the base housing 38. The bale handle 27 is not a component of the housing 5. The bale handle 27 is not a component of the base housing 38.

As illustrated in FIG. 2, the work tool 6 has a work tool plane E. The work tool plane E extends parallel with the longitudinal direction 50. The longitudinal direction 50 extends parallel with the work tool plane E. In the embodiments, the work tool plane E extends perpendicularly to the base 17 of the work apparatus 1. The handle opening 36 completely extends through the work apparatus 1, in particular the base housing 38 of the work apparatus 1, in the direction perpendicular to the work tool plane E. In the set-down position, the work tool plane E extends perpendicularly to the horizontal plane. When the work apparatus 1 is set down on a horizontal plane, the work tool plane E extends perpendicularly to the horizontal plane. The work tool 6 revolves in the work tool plane E. In the embodiment, the saw chain revolves in the work tool plane E about the guide bar 33. However, there may also be provision, particularly when the work apparatus is an abrasive cutter, for the work tool 6 to be a circular saw blade or a separation disk. In this case, the circular saw blade rotates in the work tool plane. The rotation axis of the work tool 6 extends perpendicularly to the work tool plane E.

Figure 3:
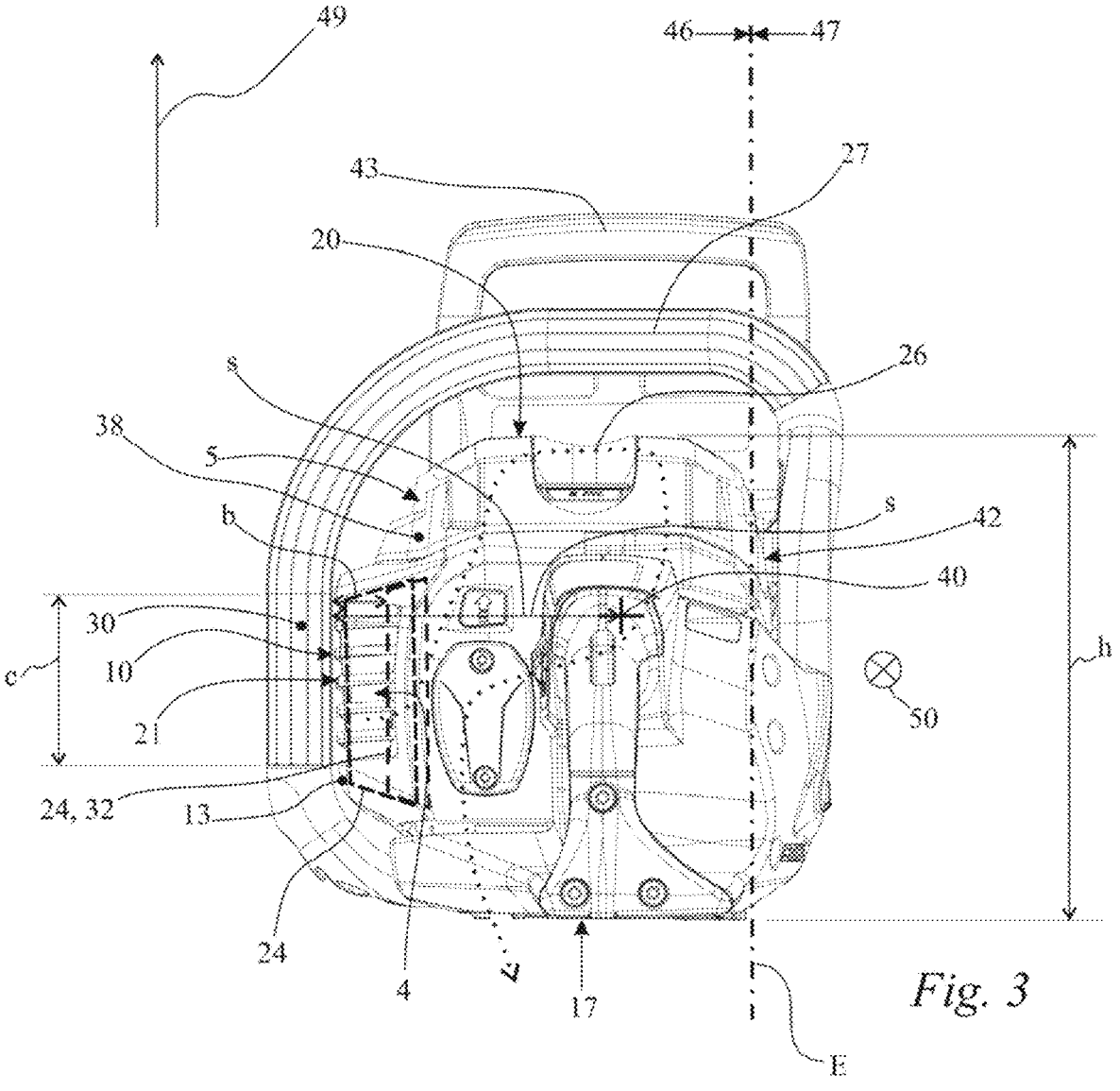
FIG. 3 shows a side view of the rear end of the work apparatus from FIG. 1 in the direction of the longitudinal direction thereof.
Figure 4:
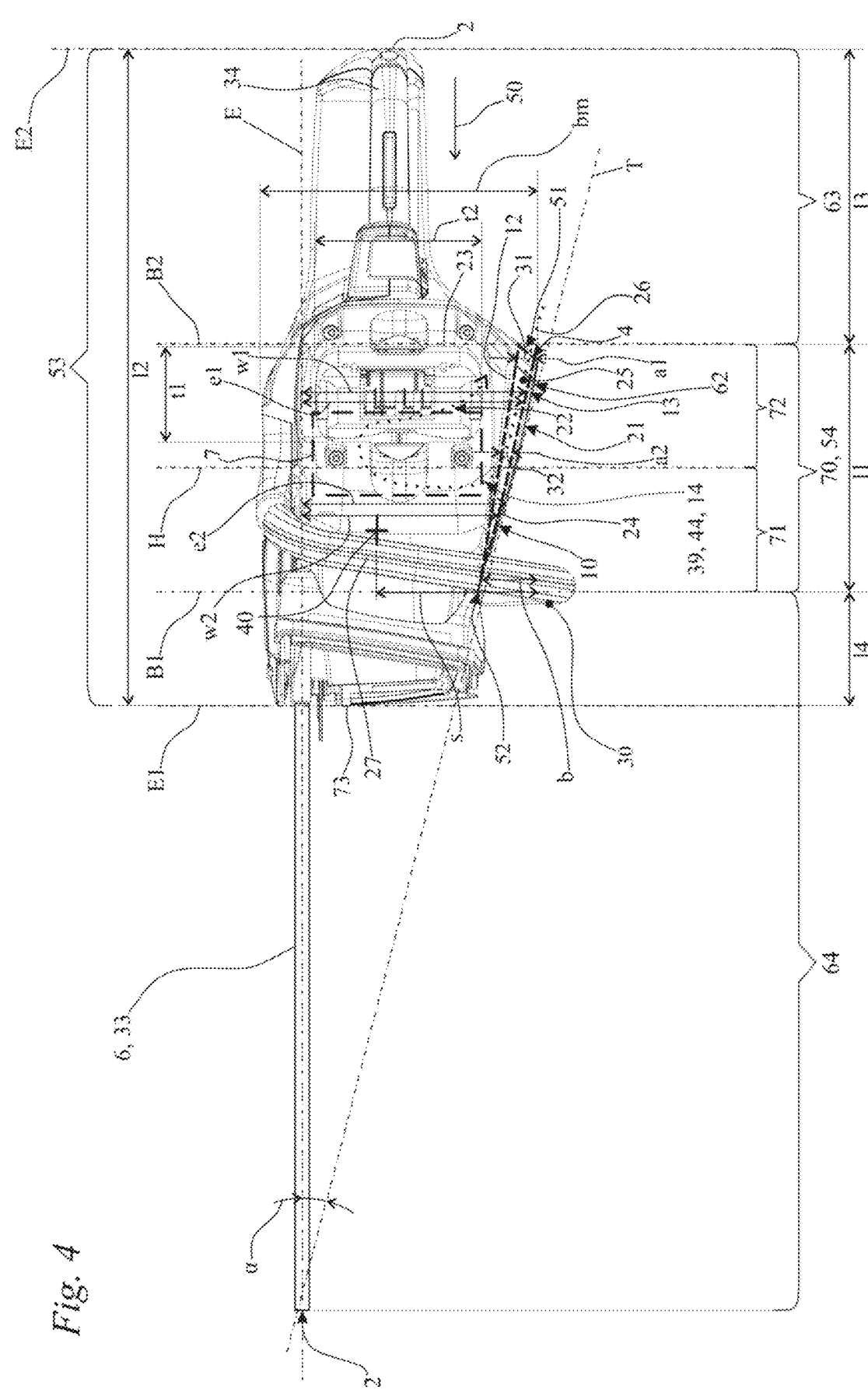
FIG. 4 shows a schematic plan view from above of the work apparatus from FIG. 1 or a schematic plan view from above of the work apparatus from FIG. 2A or a schematic plan view from above of the work apparatus from FIG. 9.
Figure 5:
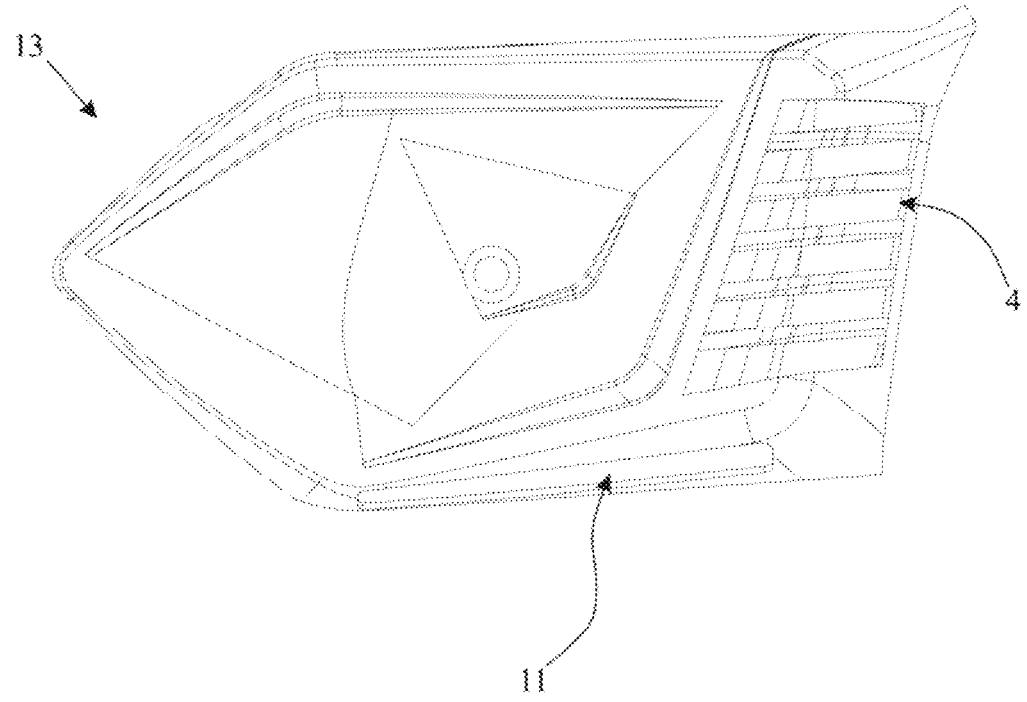
FIG. 5 shows a side view of the outer side of the filter cover of the work apparatus from FIG. 1.
Figure 6:
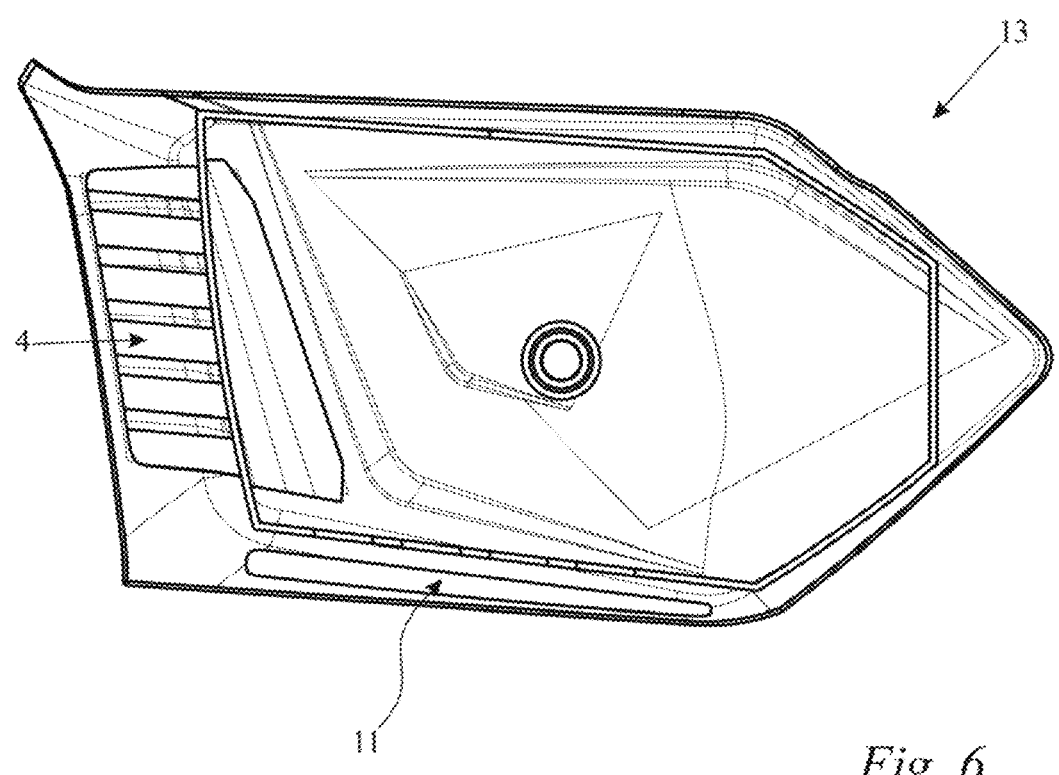
FIG. 6 shows a side view of the inner side of the filter cover of the work apparatus from FIG. 1.
Figure 7:
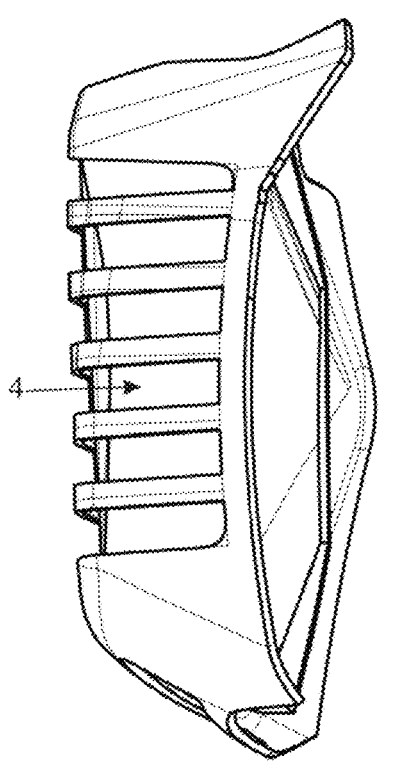
FIG. 7 shows a side view of the rear side of the filter cover from FIG. 5, which faces the rear end of the work apparatus in the assembled state of the filter cover.
Figure 8:
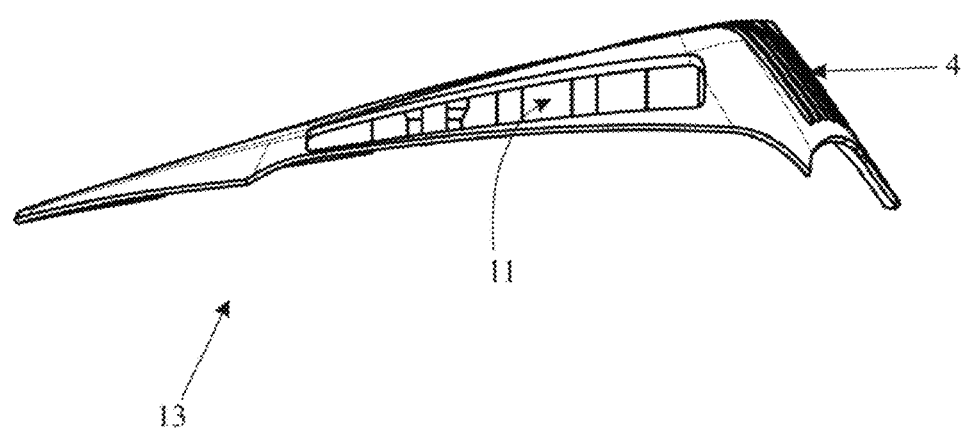
FIG. 8 shows a plan view from below of the filter cover from FIG. 5, toward the lower side which is directed downward in the assembled state of the filter cover when the work apparatus is set down on the set-down surface thereof on a horizontal surface.
Figure 9:
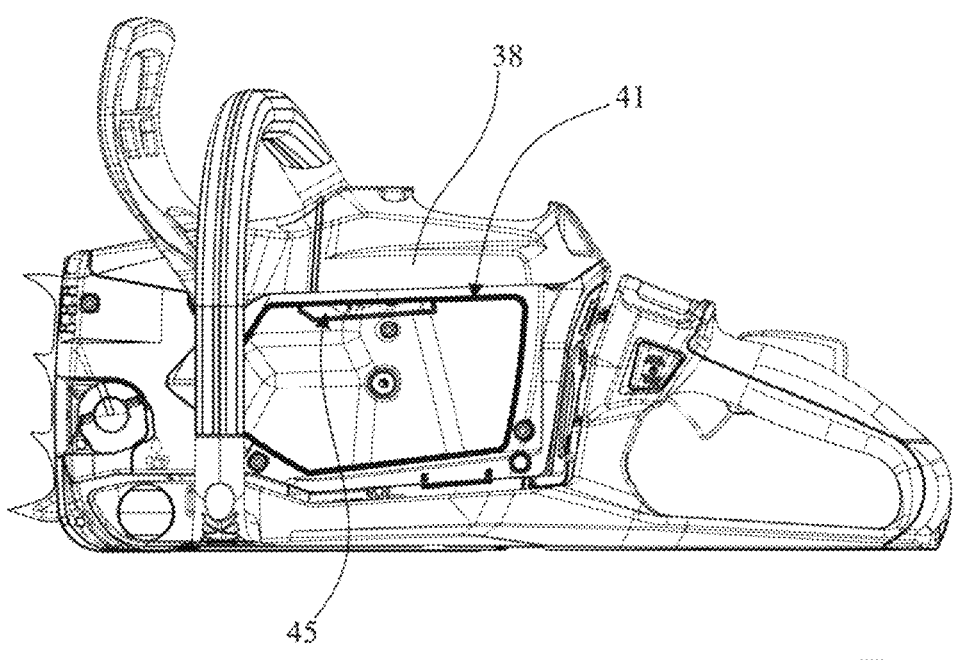
FIG. 9 shows a schematic side view of an alternative embodiment of the work apparatus from FIG. 1 with a disassembled filter cover and disassembled air filter component in a viewing direction perpendicular to the first side of the work tool plane of the work tool (not illustrated) on which the air filter component is also to be arranged.
Figure 10:
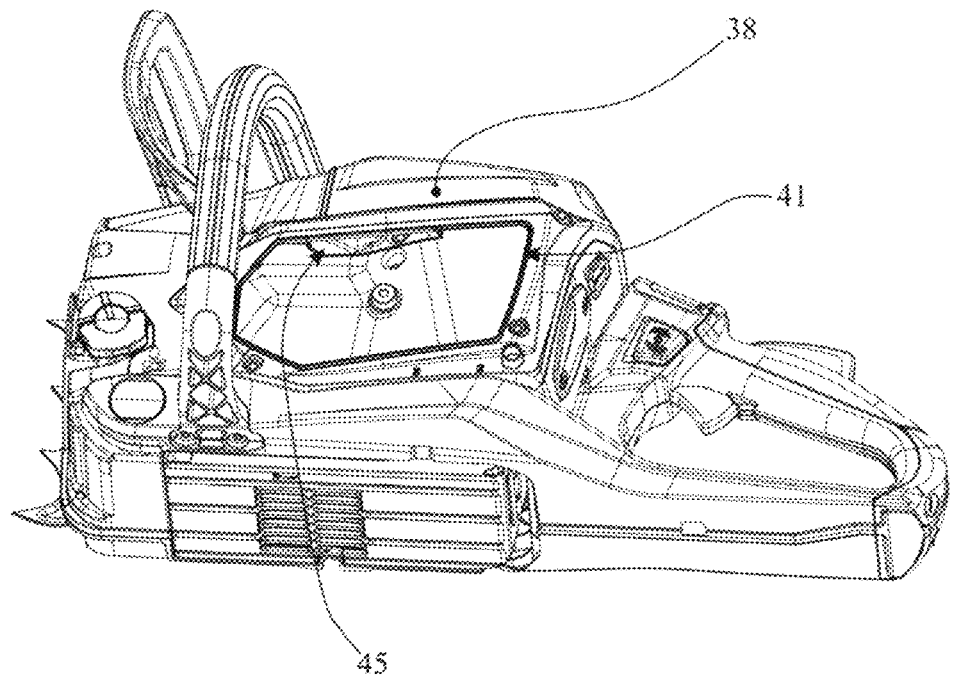
FIG. 10 shows a perspective view from below of the work apparatus from FIG. 9 with the disassembled filter cover, in which the opening into an interior space of a base housing can be seen.

As can be seen in FIGS. 2, 3 and 4, the inlet opening 4 is arranged in this embodiment so that cooling air can flow in the longitudinal direction 50 through the inlet opening 4. The cooling air can thus be introduced into the work apparatus 1 in the direction from the rear end 3 of the work apparatus 1 toward the front end 2 of the hand-guided work apparatus 1 through the inlet opening 4. The fact that the cooling air can flow in the longitudinal direction 50 through the inlet opening 4 can be seen in particular in FIG. 3. In this side view toward the rear end 3, the inlet opening 4 for the cooling air can be seen from the exterior into the interior of the hand-guided work apparatus 1. More than half, in particular more than two-thirds, of the cooling air is introduced in the longitudinal direction 50 through the inlet opening 4 into the work apparatus 1.

In the embodiment according to FIG. 2A, however, there is provision for the cooling air to be introduced into the work apparatus 1 substantially in the direction transverse, in particular in the direction perpendicular to the longitudinal direction 50. In the embodiment according to FIG. 2A, the cooling air is introduced into the work apparatus 1 in the direction transverse, in particular in the direction perpendicular to the work tool plane E. In the embodiment according to FIG. 2A, a lateral inlet opening 62 for the introduction of cooling air into the work apparatus 1 is provided. In the embodiment according to FIG. 2A, the air filter component 12 forms a portion of the external housing 5 of the work apparatus 1.

In all the embodiments, the work tool plane E has a first side 46 which is illustrated in FIG. 3. The work tool plane E has a second side 47. The work tool plane E separates the first side 46 from the second side 47. The air filter component 12 is completely arranged on the first side 46 of the work tool plane E. The inlet opening 4 or the inlet opening 62 is completely arranged on the first side.

As illustrated in FIG. 2 and in FIG. 2A for the alternative embodiment of the work apparatus 1 from FIG. 2, the housing 5 of the hand-guided work apparatus 1 has in a side view perpendicularly toward the work tool plane E, in particular toward the first side 46 of the work tool plane E, a housing outer contour 8. The housing outer contour 8 delimits a notional housing surface 9 during a projection of the housing outer contour 8 in the direction perpendicular to the work tool plane E onto the work tool plane E in the work tool plane E. The housing outer contour 8 encloses all the openings, which are located inside the housing outer contour 8, of the work apparatus 1. In particular, the housing outer contour 8 surrounds the handle opening 36. The housing surface 9 does not have any regions which are enclosed by the housing surface 9 and which are not included in the housing surface 9. The housing surface 9 does not have any internal contour. The housing surface 9 is delimited by a single delimiting line, which extends in a closed manner around the housing surface 9, that is, the housing outer contour 8.

The work apparatus 1 includes in all the embodiments a brake lever 43. The brake lever 43 is pivotably supported on the base body 37. The brake lever 43 is pivotably supported on the housing 5. The brake lever 43 serves to brake the work tool 6. The brake lever 43 is partially located outside the housing outer contour 8. The brake lever 43 projects beyond the housing outer contour 8.

The work apparatus 1 includes in all the embodiments a claw stop 44 illustrated in FIG. 2. The claw stop 44 is fixed to the housing 5. The claw stop 44 acts as a stop of the work apparatus 1 when the work tool 6 is engaged in a workpiece. The claw stop 44 is at least partially located outside the housing outer contour 8. The claw stop 44 projects beyond the housing outer contour 8.

The work tool 1 is (except for the embodiment according to FIG. 2A) free from openings for introducing cooling air into the work apparatus 1 in the side view perpendicularly toward the first side 46 of the work tool plane E inside the housing outer contour 8 over at least 95%, in particular over at least 97%, advantageously over at least 98.5% of the housing surface 9. The side view perpendicularly toward the first side 46 of the work tool plane E is the side view of the work apparatus 1, in which the viewing direction is in the direction perpendicular to the work tool plane E, that is, from the first side 46 of the work tool plane E. Therefore, the viewer is located at the first side 46 of the work tool plane E and looks in the direction of the work tool plane E.

A projection of all the openings, which are visible in the side view perpendicularly toward the first side 46 of the work tool plane E, for introducing cooling air in the direction perpendicular to the work tool plane E toward the work tool plane E covers in the housing surface 9 a surface proportion of less than 5%, in particular less than 3%, advantageously less than 1.5% of the housing surface 9. The region of the housing surface 9 which is free from projections of the openings for introducing cooling air into the work apparatus 1 is at least 95%, in particular at least 97%, in the embodiment at least 98.5% of the housing surface 9.

The term "opening" is used to denote the portion of a penetration opening for introducing cooling air into the work apparatus 1 and which can be seen in the side view in the direction perpendicularly toward the first side 46 of the work tool plane E. The penetration opening may be greater than the opening. In the side view in the direction perpendicularly toward the first side 46 of the work tool plane E, the penetration opening can be covered by components of the work apparatus 1.

The inlet opening 4 is a penetration opening for introducing cooling air into the work apparatus 1. The inlet opening 4 is arranged at the outer side of the work apparatus 1. The inlet opening 4 constitutes the first inlet port for introducing cooling air from the exterior into the work apparatus 1. The inlet opening 4 is an opening for introducing cooling air into the work apparatus 1 in the above-described sense. In the embodiment, the projected surface of the opening of the inlet opening 4 and the penetration opening of the inlet opening 4 is identical. However, it may also be the case that the projected surface of the penetration opening is greater than the projected surface of the opening.

Instead of in the work tool plane E, the housing outer contour 8 can also delimit the housing surface 9 in a notional plane which extends parallel with the work tool plane E.

As illustrated in FIG. 2, the work apparatus 1 has an outer wall 10. The inlet opening 4 completely extends through the outer wall 10. A penetration opening completely extends through the outer wall 10. An opening completely extends through the outer wall 10. The outer wall 10 constitutes the direct delimitation of the work apparatus 1 with respect to the external region. The outer wall 10 at least partially forms a wall of the housing 5.

As illustrated particularly in FIGS. 2 and 5 to 8, the work apparatus 1 (except for the embodiment according to FIG. 2A) has a lower inlet opening 11. The lower inlet opening 11 is provided for the introduction of cooling air into the work apparatus 1. The lower inlet opening 11 is provided in addition to the inlet opening 4. The lower inlet opening 11 is arranged in such a manner that cooling air can flow in an upward direction 49 through the lower inlet opening 11. The flow cross section of the lower inlet opening 11 when viewed in an upward direction 49 is at least twice as large, in the embodiment at least three times as large as the flow cross section of the lower inlet opening 11 when viewed in a longitudinal direction. The upward direction 49 extends in the direction transverse relative to the longitudinal direction 50. The upward direction 49 extends in the direction parallel with the work tool plane E. In the embodiment, the upward direction 49 extends in the direction perpendicular to the longitudinal direction 50. If the work apparatus 1 is set down on a horizontal plane in the set-down position provided therefor, the upward direction 49 extends in the embodiment perpendicularly to the horizontal plane. In the embodiment, the upward direction 49 extends perpendicularly to the base 17. In the embodiments (with the exception of FIG. 2A), the lower inlet opening 11 is configured separately from the inlet opening 4. However, there may also be provision for a single inlet opening to be provided, through which both an introduction of cooling air in the longitudinal direction 50 and an introduction of cooling air in the upward direction 49 into the work apparatus 1 is possible. In this case, the single inlet opening is subdivided only in a notional manner into an inlet opening 4 and a lower inlet opening 11.

The work apparatus 1 is configured in such a manner that, as a result of the gravitational force, dirt which is released from the air filter component 12 and which falls down can fall out of the work apparatus 1 through the lower inlet opening 11. The lower inlet opening 11 acts as a dirt outlet. In the embodiments, with the exception of FIG. 2A, there may be provision for the air filter component 12 to be inclined at an angle of at least 5° with respect to the upward direction 49. In all the embodiments, the air filter component 12 substantially extends in one plane.

As schematically depicted in FIGS. 3 and 4 with a broken line, the hand-guided work apparatus 1 has in all the embodiments with the exception of the embodiment according to FIG. 2A an inlet space 24. The inlet space 24 serves to introduce cooling air into the work apparatus 1. The work apparatus 1 is configured in such a manner that cooling air initially enters the inlet space 24 in an unfiltered manner.

The cooling air is then discharged from the inlet space 24 through the air filter component 12 into a clean air chamber 14. This applies to all the embodiments. The region along the flow path 26 downstream of the air filter 12 is referred to as the clean air chamber 14.

In both embodiments according to FIGS. 1, 2, 2A, 3 and 4, the cooling air is introduced directly after passing the air filter component 12 into an interior space 39 of the base body 37. Cooling air which is to be filtered by the air filter component 12 is introduced into the inlet space 24 into the work apparatus 1. The air filter component 12 delimits the inlet space 24.

The inlet space 24 (in all the embodiments, except for the one present according to FIG. 2A) delimits a portion 25 of a flow path 26 for cooling air. The path of the flow path 26 in the work apparatus 1 can be taken from viewing FIGS. 1, 3 and 4 together for all the embodiments. The flow path 26 is schematically depicted with a broken line. The flow path 26 leads from the inlet opening 4 to the motor 7. The position of the motor 7 within the base housing 38 of the base body 37 of the hand-guided work apparatus 1 is also schematically depicted in FIG. 4 with a broken line. The flow path 26 leads from the motor 7 out of the work apparatus 1. The flow path 26 leads through the inlet space 24. The inlet space 24 is a component of the flow path 26.

The inlet space 24 has along the flow path 26 the flow cross sections 31, 32 which are schematically depicted with a broken line in FIGS. 3 and 4 by way of example for all the embodiments with the exception of the embodiment according to FIG. 2A. By way of example, the first flow cross section 31 and the second flow cross section 32 are illustrated in FIGS. 3 and 4. Cooling air which passes the second flow cross section 32 has also passed the first flow cross section 31. The cooling air reaches through the first flow cross section 31 the second flow cross section 32. The inlet space 24 delimits the flow cross sections 31, 32. The air filter component 12 delimits the flow cross sections 31, 32, in particular all the flow cross sections 31, 32. The air filter component 12 bears directly against the flow cross sections 31, 32. The first flow cross section 31 is arranged upstream of the second flow cross section 32 with respect to the flow path 26. The second flow cross section 32 is arranged downstream of the first flow cross section 31 with respect to the flow path 26. When the cooling air enters the work apparatus 1, the cooling air passes the first flow cross section 31 before the second flow cross section 32. By definition, the flow cross sections 31, 32 are orientated perpendicularly to the longitudinal direction 50 of the work apparatus 1. The flow cross sections 31, 32 extend perpendicularly to the work tool plane E. The flow cross sections 31, 32 extend in planes which extend perpendicularly to the longitudinal direction 50. The flow cross sections 31, 32 extend at least transversely relative to the extent of the flow path 26. The flow cross sections 31, 32 become smaller in the direction of the flow path 26. The flow cross sections 31, 32 become smaller in the longitudinal direction 50. The first flow cross section 31 is greater than the second flow cross section 32. The second flow cross section 32 is smaller than the first flow cross section 31. The surface of the second flow cross section 32 is smaller than the surface of the first flow cross section 31. The work apparatus 1 is configured so that the surface of the flow cross sections 31, 32 decreases in the direction of the flow path 26, in particular in the longitudinal direction 50.

In the embodiments (except for FIG. 2A), the flow cross sections 31, 32 become continuously smaller in the direction of the flow path 26, in particular in the longitudinal direction 50.

The inlet space 24 is delimited at least at one side by an outer wall 10, in particular by an inner side of the outer wall 10 of the work apparatus 1. The outer wall 10 can be an outer wall of the inlet space 24. In the embodiments (except for FIG. 2A), the inlet space 24 is delimited at three sides by the outer wall 10 of the work apparatus 1, as can be seen in FIGS. 2, 3 and 4. The outer wall 10 of the work apparatus 1 delimits the work apparatus 1 in all the embodiments (including FIG. 2A) in an outward direction. In the region of the inlet space 24, the outer wall 10 forms a projection (except for FIG. 2A). In all the embodiments (except for FIG. 2A), the outer wall 10 projects beyond the base body 37 of the work apparatus 1 in the region of the inlet space 24, in particular in the direction perpendicular to the work tool plane E. The outer wall 10 also delimits the base body 37 of the work apparatus 1. The outer wall 10 is at least partially the outer wall of the base housing 38. As illustrated in FIG. 1, the work apparatus 1 has the air filter component 12 for filtering the cooling air. The air filter component 12 at least partially delimits the inlet space 24. The air filter component 12 is arranged between the interior of the inlet space 24 and the clean air chamber 14 for all the embodiments except for FIG. 2A. For the embodiment according to FIGS. 1, 2, 3 and 4 (if it is associated with FIG. 1), the air filter component 12 is arranged between the interior of the inlet space 24 and the interior space 39 of the base body 37 of the hand-guided work apparatus 1. The position of the interior space 39 is depicted in FIG. 4. The interior space 39 is delimited by the base housing 38 of the base body 37. The motor 7 is arranged in the interior space 39. The interior space 39 has an opening 41 which is illustrated in FIG. 1. The opening 41 is an opening in the base housing 38 of the base body 37. The opening 41 completely extends through a wall of the base housing 38. The opening 41 serves to introduce cooling air into the interior space 39. The interior space 39 is delimited by the base housing 38. In the embodiment according to FIGS. 1, 2, 3 and 4 (if it is associated with FIG. 1), the air filter component 12 is arranged in, on or at the opening 41.

Figure 11:
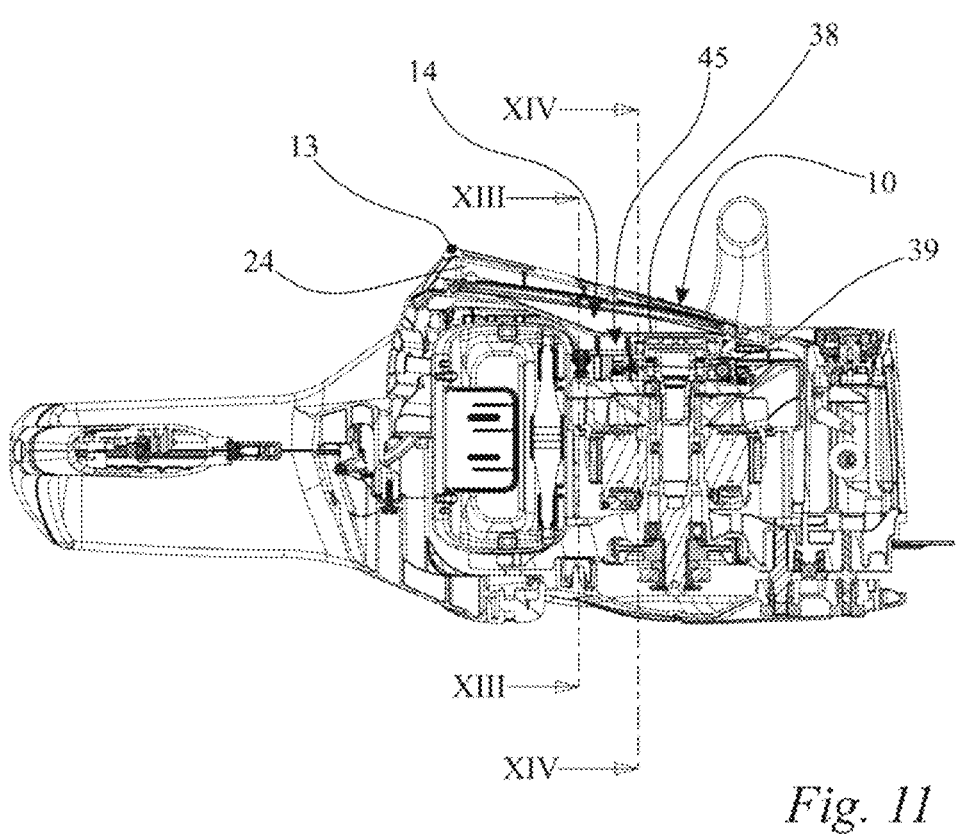
FIG. 11 shows a sectioned illustration of a horizontal section through the work apparatus from FIG. 9 with the assembled air filter component and assembled filter cover along the plane of section XI-XI depicted in FIG. 13.
Figure 12:
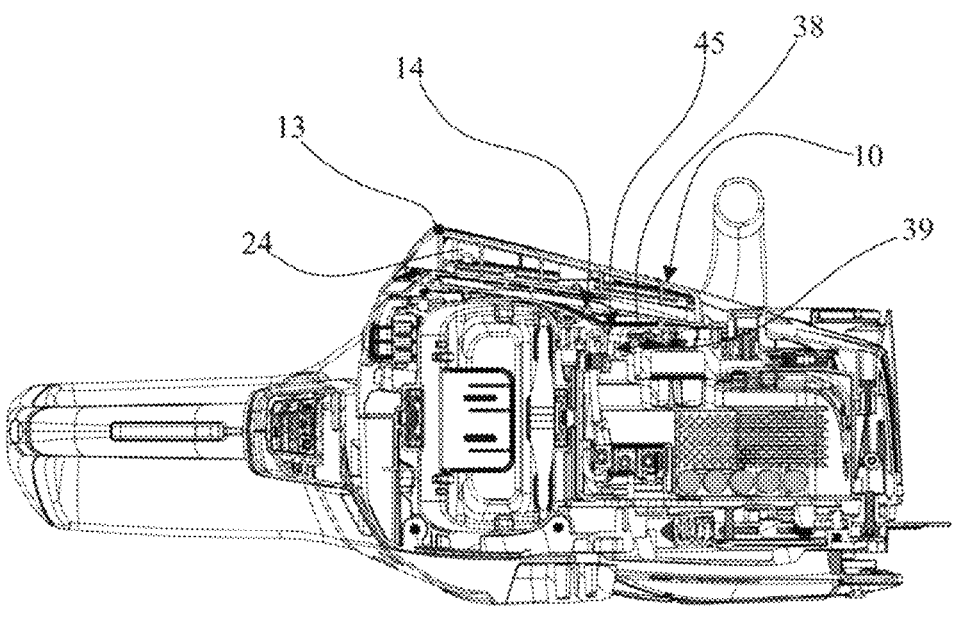
FIG. 12 shows a sectioned illustration of a horizontal section through the work apparatus from FIG. 9 with the assembled air filter component and assembled filter cover along the plane of section XII-XII depicted in FIG. 13.

In an alternative embodiment (FIGS. 9 to 14), there may be provision for the opening 41 in, on or at which the air filter component 12 is arranged to be a recess in the base housing 38 of the base body 37. In this case, the opening 41 does not extend completely through the wall of the base housing 38. This variant is illustrated in FIGS. 9 to 14. In this case, the base housing 38 has a wall penetration opening 45. The wall penetration opening 45 extends completely through a wall of the base housing 38. The wall penetration opening 45 is arranged in the recess of the base housing 38. Cooling air can be drawn into the interior space 39 of the base housing 38 through the wall penetration opening 45. Cooling air can penetrate through the wall penetration opening 45 into the interior space 39 of the base housing 38. The cooling air is filtered between the air filter component 12 and the wall penetration opening 45. The region along the flow path 26 downstream of the air filter component 12 is referred to as the clean air chamber 14. The recess in the base housing 38 is a portion of the clean air chamber 14, as illustrated in FIGS. 11 and 12.

The recess delimits the flow path 26 in the region between the air filter component 12 and the wall penetration opening 45 in a funnel-like manner. After the cooling air has been filtered by the air filter component 12, the effective flow cross section along the flow path 26 is reduced.

The inlet opening 4 which is illustrated by way of example in FIG. 2 for all the embodiments except for FIG. 2A forms an inlet of the inlet space 24. The air filter component 12 forms an outlet of the inlet space 24. At the same time, the air filter component 12 forms a side wall of the inlet space 24. On the one hand, cooling air flows along the air filter component 12 and, on the other hand, cooling air can be introduced into the clean air chamber 14 through the air filter component 12.

Air can penetrate through the air filter component 12 out of the inlet space 24 into the interior space 39 through the opening 41 of the base housing 38. In the embodiment according to FIGS. 1, 2, 3 and 4 (as long as it is associated with FIG. 1), the cooling air is introduced through the air filter component 12 directly into the interior space 39. In the embodiment according to FIGS. 9 to 14, the cooling air between the air filter component 12 and the interior space 39 passes the recess. The air filter component 12 simultaneously forms an outlet of the inlet space 24 and delimits the inlet space 24. In all the embodiments with the exception of FIG. 2A, the air filter component 12 delimits the inlet space 24 in the direction perpendicular to the work tool plane E.

The inlet space 24 has a spatial volume. The spatial volume is the volume of the inlet space 24 which can be filled with cooling air. With respect to the longitudinal direction 50, the spatial volume has a rearmost point. The rearmost point of the spatial volume has the greatest spacing, measured in the longitudinal direction 50, from the work tool 6. The rearmost point of the spatial volume has the greatest spacing, measured in the longitudinal direction 50, from the front end 2 of the work apparatus 1. With respect to the longitudinal direction 50, the spatial volume has a foremost point. The foremost point is located in front of the rearmost point with respect to the longitudinal direction 50. The foremost point is located in front of the rearmost point in the longitudinal direction 50. The foremost point of the spatial volume has the greatest spacing, measured in the longitudinal direction 50, from the operator-controlled handle 34. The foremost point of the spatial volume has the greatest spacing, measured in the longitudinal direction 50, from the rear end 3 of the work apparatus 1. A longitudinal extent 54 of the inlet space 24 extends in the longitudinal direction 50 from the foremost point of the inlet space 24 as far as the rearmost point of the inlet space 24.

As illustrated in FIG. 2 by way of example for all the embodiments except for FIG. 2A, the opening 41 has a longitudinal extent f. The longitudinal extent f is measured in the longitudinal direction 50. The inlet space 24 has a length l which is measured in the longitudinal direction 50. The inlet space 24 extends in the longitudinal direction 50. The length, which is measured in the longitudinal direction 50, of the longitudinal extent 54 of the inlet space 24 corresponds to the length l of the inlet space 24. The length l is measured from the rearmost point of the inlet space 24 as far as the foremost point of the inlet space 24. The air filter component 12 delimits the inlet space 24 in the direction transverse relative to its own longitudinal extent. In the embodiment, the longitudinal extent f of the opening 41 is at least 70%, in particular at least 80%, advantageously at least 85% of the length l of the inlet space 24. Cooling air can therefore penetrate over a very large portion of the longitudinal extent of the inlet space 24 out of the inlet space 24 through the opening 41, in particular through the air filter component 12 into the clean air chamber 14, in particular into the interior space 39 of the base body 37 of the hand-guided work apparatus 1. In some respects, the inlet space 24 is open along its longitudinal extent over great portions. The inlet space 24 can also be described as being half-open.

The cooling air flows in the inlet space 24 along a filter surface of the air filter component 12. The cooling air is gradually introduced into the clean air chamber 14 of the work apparatus 1 through the air filter component 12 while flowing along the filter surface.

The inlet space 24 can also be referred to as a flow channel.

As illustrated in FIG. 4, the inlet space 24 has a width a1, a2 which is measured in the direction perpendicular to the work tool plane E and which varies in the longitudinal direction 50. The width a1, a2 is measured between the inner side of the outer wall 10 and the air filter component 12. The first width a1 is measured at the inlet opening 4. The first width a1 at the inlet opening 4 corresponds to the maximum width of the inlet space 24. The width of the inlet space 24 continuously decreases in the longitudinal direction 50. The second width a2 is measured with respect to the longitudinal direction 50 in the region of the motor 7. The second width a2 is measured with respect to the flow path 26 downstream of the first width a1. The second width a2 is smaller than the first width a1. The first width a1 is associated with the first flow cross section 31. The second width a2 is associated with the second flow cross section 32. The first width a1 is the width of the first flow cross section 31. The second width a2 is the width of the second flow cross section 32. The inlet space 24 is substantially wedge-shaped. In particular, the inlet space 24 is, when viewed perpendicularly to the longitudinal direction 50 and at the same time parallel with the work tool plane E, substantially wedge-shaped. In the set-down position, the inlet space 24 is wedge-shaped when viewed perpendicularly to the horizontal plane.

When cooling air is drawn into the interior of the work apparatus 1 by a fan which is not illustrated, in particular by a fan wheel which is not illustrated, the cooling air is introduced in the embodiments according to FIGS. 1, 2, 3, 4 (if associated with FIG. 1 or 9) and 9 to 14 through the inlet opening 4, in the embodiment according to FIGS. 2A and 4 (if associated with FIG. 2A) directly through the air filter component 12 into the work apparatus 1. The cooling air follows the flow path 26. In this instance, the cooling air flows in the inlet space 24 (FIGS. 1, 2, 3, 4 (if associated with FIGS. 1 and 9) and 9 to 14, with the exception of FIG. 2A) along the air filter component 12. While the cooling air is flowing along the air filter component 12, cooling air can leave the inlet space 24 through the air filter component 12. In this manner, while the cooling air is flowing along the air filter component 12, more and more air is discharged out of the inlet space 24 by the air filter component 12 and is introduced through the opening 41, which is located behind, into the clean air chamber 14, in particular into the interior space 39. In this manner, the air volume which passes the flow cross sections 31, 32 becomes smaller and smaller along the flow path 26, in particular in the longitudinal direction 50, inside the inlet space 24. In that the flow cross-sections 31, 32 become smaller in the direction of the flow path 26, the volume flow of the cooling air in the inlet space 24 can nevertheless be kept substantially constant. Uniform flow conditions are thereby produced.

As illustrated in FIG. 3 (and also in FIGS. 2 and 2A) by way of example for all the embodiments and as described below for all the embodiments (including the one according to FIG. 2A), the base housing 38, in particular the housing 5, has a housing cover 20 which is opposite the base 17. The housing cover 20 delimits the base housing 38, in particular the housing 5 of the work apparatus 1 in an upward direction 49. The upward direction 49 extends perpendicularly to the longitudinal direction 50 and at the same time parallel with the work tool plane E. The upward direction 49 extends, if the work apparatus 1 is set down in the set-down position on the horizontal plane, perpendicularly upward relative to the horizontal plane. The base 17 delimits the base housing 38, in particular the housing 5, in the direction counter to the upward direction 49. The base housing 38, in particular the housing 5, has a first side surface 21. The first side surface 21 connects the housing cover 20 to the base 17. The first side surface 21 is a component of the outer wall 10. The first side surface 21 extends in the longitudinal direction 50. The base housing 38, in particular the housing 5, of the work apparatus 1 has a second side surface 42. The second side surface 42 connects the housing cover 20 to the base 17. The second side surface 42 extends in the longitudinal direction 50. The first side surface 21 is opposite the second side surface 42, in particular in the direction perpendicular to the work tool plane E. The first side surface 21 delimits the base housing 38, in particular the housing 5 in the direction perpendicular to the work tool plane E at the first side 46 of the work tool plane E. The second side surface 42 delimits the base housing 38, in particular the housing 5 of the work apparatus 1 at the second side 47 of the work tool plane E. The first side surface 21 extends between the housing cover 20 and the base 17. The air filter component 12 is arranged on the first side surface 21 of the base housing 38 of the base body 37 of the hand-guided work apparatus 1. The opening 41 in the base housing 38 is arranged on the first side surface 21 of the base housing 38. The first side surface 21 forms an outer side of the work apparatus 1, in particular of the housing 5 of the work apparatus 1. The air filter component 12 is arranged in all the embodiments on the first side surface 21. In the embodiment according to FIG. 2A, the air filter component 12 is a component of the first side surface 21. The air filter component 12 forms a portion of the first side surface 21. In the remaining embodiments, the air filter component 12 is arranged in the region of the first side surface 21. In these remaining embodiments, the first side surface 21 covers the air filter component 12. The air filter component 12 is arranged in all the embodiments on the first side 46 of the work tool plane E. The air filter component 12 is arranged nearer the first side surface 21 than the work tool plane E with respect to the direction perpendicular to the work tool plane E. A spacing, measured in the direction perpendicular to the work tool plane E, of the air filter component 12 from the work tool plane E is at least five times, in the embodiment at least ten times as large as a spacing, measured in the direction perpendicular to the filter surface of the air filter component 12, of the filter surface of the air filter component 12 from the first side surface 21.

As illustrated in FIG. 2 by way of example for all the embodiments, the air filter component 12 has in a notional projection in the direction perpendicular to the work tool plane E onto the work tool plane E an outer contour 28 of the filter. The outer contour 28 of the filter delimits a notional filter surface 29. The filter surface 29 extends in the work tool plane E. FIG. 2 schematically depicts the filter surface 29 with a broken line. The filter surface 29 is at least 5%, in particular at least 10%, in the embodiment at least 15% of the housing surface 9. The filter surface 29 is at least 100 cm², in the embodiment at least 125 cm². The surfaces are measured in projection into the work tool plane E. These surfaces are measured in particular as a side view perpendicularly to the work tool plane E.

As illustrated in FIG. 4 by way of example for all the embodiments, the air filter component 12 has in the longitudinal direction 50 a filter's longitudinal extent 70. The air filter component 12 is arranged between a first notional contact plane B1 and a second notional contact plane B2. The first contact plane B1 and the second contact plane B2 each extend perpendicularly to the longitudinal direction 50. The air filter component 12 extends in particular from the first notional contact plane B1 as far as the second notional contact plane B2.

The air filter component 12 has a handle end 51. The handle end 51 of the air filter component 12 faces the operator-controlled handle 34. The handle end 51 delimits the air filter component 12 in the direction counter to the longitudinal direction 50. The air filter component 12 has a work tool end 52. The work tool end 52 of the air filter component 12 faces the work tool 6. The work tool end 52 delimits the air filter component 12 in the longitudinal direction 50. The bale handle 27 is arranged in the region of the work tool end 52.

The first contact plane B1 is tangent to the air filter component 12 at the handle end 51 of the air filter component 12. The second contact plane B2 is tangent to the air filter component 12 at the work tool end 52 of the air filter component 12. The filter's longitudinal extent 70, in particular the region of the filter's longitudinal extent 70 of the air filter component 12 extends in the longitudinal direction 50 from the handle end 51 as far as the work tool end 52. The region of the filter's longitudinal extent 70 is arranged in all the embodiments with respect to the longitudinal direction 50 between, in particular completely between, the operator-controlled handle 34 and the work tool 6. The filter's longitudinal extent 70 extends between, in particular from the first contact plane B1 as far as the second contact plane B2. The region of the filter's longitudinal extent 70 extends between, in particular from the first contact plane B1 as far as the second contact plane B2. The region of the filter's longitudinal extent 70 is the entire space between the two contact planes B1 and B2.

The filter's longitudinal extent 70 of the filter component 12 is located with respect to the longitudinal direction 50 between a rear region 63 of the work apparatus 1 and a front region 64 of the work apparatus 1. The rear region 63 of the work apparatus 1 extends with respect to the longitudinal direction 50 from the rear end 3 of the work apparatus 1 as far as the air filter component 12, in particular as far as the filter's longitudinal extent 70 of the air filter component 12, in particular as far as the second contact plane B2. The front region 64 of the work apparatus 1 extends with respect to the longitudinal direction 50 from the air filter component 12, in particular from the filter's longitudinal extent 70 of the air filter component 12, in particular from the first contact plane B1, as far as the front end 2 of the work apparatus 1. The operator-controlled handle 34 is arranged in the rear region 63 in the embodiments. However, there may also be provision for the operator-controlled handle 34 to be arranged only partially or not at all in the rear region 63. This may, for example, be the case in a tree-pruning saw. In the embodiments, the work tool 6 is at least partially, in particular virtually completely arranged in the front region 64. The air filter component 12, in particular the filter's longitudinal extent 70 of the air filter component 12 is located with respect to the longitudinal direction 50 in front of the rear region 63. The air filter component 12, in particular the filter's longitudinal extent 70 is located with respect to the longitudinal direction 50 behind the front region 64, in particular behind the first contact plane B1.

The base housing 38 has a base longitudinal extent 53 in the longitudinal direction 50. The base longitudinal extent 53 extends in the longitudinal direction 50 from the rear end 3 of the work apparatus 1 as far as an end point 73 of the base housing 38. The end point 73 delimits the base housing 38 in the longitudinal direction 50. At the end point 73, a notional first plane E1 which extends perpendicularly to the work tool plane E is tangent to the longitudinal end, which faces away from the rear end 3 of the work apparatus 1, of the base housing 38. At the rear end 3, a notional second plane E2 which extends perpendicularly to the work tool plane E is tangent to the rear end 3 of the work apparatus 1. The base longitudinal extent 53 extends from the second plane E2, which is associated with the rear end 3, as far as the first plane E1 which is associated with the end point 73. The space between the first plane E1 and the second plane E2 is referred to as the region of the base longitudinal extent 53.

The rear region 63 is the region which is located between the second contact plane B2 and the second plane E2. The front region 64 is the space which is located between the first contact plane B1 and the first plane E1.

A filter length l1, which is measured in the longitudinal direction 50, of the filter's longitudinal extent 70 is at least 20%, in particular at least 30% of a base length l2, which is measured in the longitudinal direction 50, of the base longitudinal extent 53. The filter length l1 is at most 60%, in particular at most 50% of the base length l2.

The filter's longitudinal extent 70 has a rear spacing 13, which is measured in the longitudinal direction 50, relative to the start point of the base longitudinal extent 53, in particular relative to the rear end 3, of at least 30%, in particular of at least 40% of the base length l2. The filter component 12 has the rear spacing 13, which is measured in the longitudinal direction 50, relative to the start point of the base longitudinal extent 53, in particular relative to the rear end 3, of at least 30%, in particular of at least 40% of the base length l2. The filter's longitudinal extent 70 has a front spacing 14, which is measured in the longitudinal direction 50, relative to the end point of the base longitudinal extent 53, in particular relative to the end point 73 of the base housing 38, of at least 10%, in particular of at least 15% of the base length l2. The air filter component 12 has the front spacing 14, which is measured in the longitudinal direction 50, relative to the end point of the base longitudinal extent 53, in particular relative to the end point 73 of the base housing 38, of at least 10%, in particular of at least 15% of the base length l2.

The filter's longitudinal extent 70 has the rear spacing 13, which is measured in the longitudinal direction 50, relative to the start point of the base longitudinal extent 53, in particular relative to the rear end 3, of at most 60%, in particular of at most 50% of the base length l2. The air filter component 12 has the rear spacing 13, which is measured in the longitudinal direction 50, relative to the start point of the base longitudinal extent 53, in particular relative to the rear end 3, of at most 60%, in particular of at most 50% of the base length l2. The filter's longitudinal extent 70 has the front spacing 14, which is measured in the longitudinal direction 50, relative to the end point 73 of the base longitudinal extent 53, in particular relative to the end point 73 of the base housing 38, of at most 40%, in particular of at most 20% of the base length l2. The air filter component 12 has the front spacing 14, which is measured in the longitudinal direction 50, relative to the end point of the base longitudinal extent 53, in particular relative to the end point 73 of the base housing 38, of at most 40%, in particular of at most 20% of the base length l2.

The base length l2 corresponds to the spacing of the first plane E1 relative to the second plane E2. The filter length l1 corresponds to the spacing of the first contact plane B1 relative to the second contact plane B2. The rear spacing 13 corresponds to the spacing of the second plane E2 relative to the second contact plane B2. The front spacing 14 corresponds to the spacing of the first contact plane B1 relative to the first plane E1.

The region of the air filter component 12 extends in the longitudinal direction 50 over the filter's longitudinal extent 70.

FIG. 4 shows by way of example for all the embodiments a notional tangential plane T. The illustration in FIG. 4 schematically shows the relationships for all the embodiments. The description in relation to FIG. 4 relates to all the embodiments. In FIG. 4, reference numerals from all the embodiments are used. However, FIG. 4 can optionally be associated with any of the three embodiments. If FIG. 4 stands for the embodiment according to FIG. 1, then the interior space 39 is located directly behind the filter component 12. If FIG. 4 stands for the embodiment according to FIG. 2A, then the work apparatus 1 in FIG. 4 does not have a filter cover 13 or inlet opening 4, but instead a lateral inlet opening 62.

The tangential plane T extends in the set-down position of the work apparatus 1 perpendicularly to the horizontal plane for all the embodiments.

The tangential plane T is tangent to the first side surface 21 only in the region of the filter's longitudinal extent 70. The tangential plane T bears in the region of the filter's longitudinal extent 70 only against the first side surface 21, in particular the outer side of the first side surface 21. The tangential plane T does not intersect with the first side surface 21 in the region of the filter's longitudinal extent 70. The tangential plane T is tangent to the housing 5 of the work apparatus 1 only in the region of the filter's longitudinal extent 70. The tangential plane T is tangent to the outer side of the housing 5 of the work apparatus 1 only in the region of the filter's longitudinal extent 70. The tangential plane T is tangent to the outer wall 10 only in the region of the filter's longitudinal extent 70. There may be provision for the tangential plane T to intersect with the work apparatus 1, in particular the first side surface 21, in particular the housing 5, in particular the outer wall 10 in the region outside the filter's longitudinal extent 70, in particular in the front region 64 and/or in the rear region 63.

In the region of the filter's longitudinal extent 70, the tangential plane T is arranged at the first side 46 of the work tool plane E. The tangential plane T is tangent to the first side surface 21 in the region of the filter's longitudinal extent 70 at the first side 46 of the work tool plane E.

The tangential plane T intersects with the work tool plane E. The tangential plane T intersects with the work tool plane E in the region with respect to the longitudinal direction 50 in front of the air filter component 12, in particular in the region with respect to the longitudinal direction 50 in front of the filter's longitudinal extent 70, in particular in the front region 64, in particular in a region with respect to the longitudinal direction 50 in front of the front region 64. When viewed in the longitudinal direction 50, the line of section of the tangential plane T and the work tool plane E is located in front of the air filter component 12, in particular in front of the filter's longitudinal extent 70, in particular in front of the first contact plane B1. In the region with respect to the longitudinal direction 50 behind the air filter component 12, the tangential plane T does not intersect with the work tool plane E.

The filter's longitudinal extent 54 of the air filter component 12 has a front half 71 and a back half 72. The front half 71 of the filter's longitudinal extent 70 is arranged with respect to the longitudinal direction 50 in front of the back half 72 of the filter's longitudinal extent 70. The back half 72 of the filter's longitudinal extent 70 is with respect to the longitudinal direction 50 arranged nearer the operator-controlled handle 34 than the front half 71 of the filter's longitudinal extent 70. The front half 71 of the filter's longitudinal extent 70 is arranged with respect to the longitudinal direction 50 nearer the work tool 6 than the back half 72 of the filter's longitudinal extent 70. The front half 71 faces the work tool 6. The back half 72 faces the operator-controlled handle 34. The back half 72 and the front half 71 are of identical size when measured in the longitudinal direction 50. A half plane H extends perpendicularly to the longitudinal direction 50. The half plane H divides the space between the first contact plane B1 and the second contact plane B2 into two identically sized halves. The half plane H is located with respect to the longitudinal direction 50 in the center between the first contact plane B1 and the second contact plane B2. The back half 72 is located between the second contact plane B2 and the half plane H. The front half 71 is located between the half plane H and the first contact plane B1. The region of the back half 72 corresponds to the space between the second contact plane B2 and the half plane H. The region of the front half 71 corresponds to the space between the half plane H and the first contact plane B1.

The tangential plane T is tangent to the first side surface 21 of the work apparatus 1 in the region of the filter's longitudinal extent 70 only in the back half 72, in particular only in the region of the back half 72. The tangential plane T bears, in the region of the back half 72 of the filter's longitudinal extent 70, only against the first side surface 21, in particular the outer side of the first side surface 21. The tangential plane T does not intersect with the first side surface 21 in the region of the back half 72. The tangential plane T is tangent to the housing 5 of the work apparatus 1 in the region of the filter's longitudinal extent 70 only in the region of the back half 72 of the filter's longitudinal extent 70. The tangential plane T is tangent to the outer side of the housing 5 of the work apparatus 1 in the region of the filter's longitudinal extent 70 only in the region of the back half 72 of the filter's longitudinal extent 70. The tangential plane T is tangent to the outer wall 10 in the region of the filter's longitudinal extent 70 only in the region of the back half 72 of the filter's longitudinal extent 70. The tangential plane T does not intersect with the first side surface 21 of the work apparatus 1, in particular the housing 5 of the work apparatus 1, in particular the outer side of the housing 5 of the work apparatus 1, in particular the outer wall 10, in the region of the front half 71 of the filter's longitudinal extent 70. The tangential plane T is not tangent to the first side surface 21, in particular the housing 5 of the work apparatus 1, in particular the outer side of the housing 5 of the work apparatus 1, in particular the outer wall 10, in the region of the front half 71 of the filter's longitudinal extent 70. The tangential plane T is tangent to the first side surface 21 in the region of the inlet space 24, in particular in the region of the longitudinal extent 54 of the inlet space 24, only in the region of the back half, with respect to the longitudinal direction 50, of the region of the inlet space 24.

There may be provision for the tangential plane T to intersect with the work apparatus 1, in particular the first side surface 21, in particular the housing 5, in particular the outer wall 10 in the region outside the filter's longitudinal extent 70, in particular in the front region 64 and/or in the rear region 63.

The filter's longitudinal extent 70 divides the entire space into three portions. In a central portion, the filter's longitudinal extent 70 is located between the first contact plane B1 and the second contact plane B2. A rear portion adjoins the second contact plane B2. The rear end 3 is located in the rear portion. A front portion adjoins the first contact plane B1. The front end 2 of the work apparatus 1 is located in the front portion. The tangential plane T intersects with the work tool plane E in the front portion.

As illustrated in FIG. 4, a plane spacing e1, e2, which is measured perpendicularly to the work tool plane E, of the tangential plane T relative to the work tool plane E decreases in the longitudinal direction 50. The plane spacing e1, e2 is not a spacing of planes in the geometric sense, but instead the spacing of individual points or straight lines which are located within the two planes. A first plane spacing e1 is measured in the region of the second contact plane B2. A second plane spacing e2 is measured in the region of the bale handle 27, in particular in the region of the first contact plane B1. The second plane spacing e2 is smaller than the first plane spacing e1.

The tangential plane T defines an angle $\alpha$ with the work tool plane E. The angle $\alpha$ is measured in the angular range in which the air filter component 12 is also located. The angle $\alpha$ is at least 1°, in the embodiment at least 3°. The angle $\alpha$ is at most 45°, in the embodiment at most 20°. The air filter component 12 is completely arranged in a corresponding angular range.

As illustrated in FIG. 4, the outer side of the first side surface 21 has an outer side spacing w1, w2, which is measured perpendicularly to the work tool plane E, relative to the work tool plane E. The outer side spacing w1, w2 is not a spacing in the geometric sense but instead the spacing of individual points of the outer side of the first side surface 21 relative to the work tool plane E. The outer side spacing w1, w2 decreases in the longitudinal direction 50 in the region of the air filter component 12, in particular in the region of the inlet space 24.

The region of the inlet space 24 is the region in which the inlet space 24 extends with respect to the longitudinal direction 50. The longitudinal extent 54 of the inlet space 24 extends in the longitudinal direction 50 from the foremost point of the inlet space 24 as far as the rearmost point of the inlet space 24. The region of the inlet space 24 extends in the longitudinal direction 50 from the foremost point of the inlet space 24 as far as the rearmost point of the inlet space 24. The longitudinal extent 54 of the inlet space 24 is also referred to as the region of the inlet space 24. The region of the inlet space 24 has a front half with respect to the longitudinal direction 50 and a back half with respect to the longitudinal direction 50.

A first outer side spacing w1 is measured in the region of the handle end 51 of the air filter component 12, in particular in the region of the second contact plane B2. A second outer side spacing w2 is measured in the region of the work tool end 52, in particular in the region of the first contact plane B1, in particular in the region of the bale handle 27. The second outer side spacing w2 is smaller than the first outer side spacing w1.

The bale handle 27 has a bale portion 30. The bale portion 30 is located in the direction perpendicular to the work tool plane E above the air filter component 12. The bale portion 30 is located in the region of the filter's longitudinal extent 70. The bale portion 30 extends in all the embodiments substantially, in particular precisely in the direction parallel with the work tool plane E. The bale portion 30 extends in all the embodiments transversely, in particular perpendicularly to the longitudinal direction 50. The bale portion 30 is in particular completely linear. Advantageously, the bale handle 27 has in the region of the bale portion 30 virtually no curvature with respect to the upward direction 49. The bale portion 30 is in the form of a straight pipe. The bale portion 30 extends approximately parallel with the work tool plane E. The outer side spacing w1, w2 decreases from the handle end 51 of the air filter component 12 in the longitudinal direction 50 as far as the bale portion 30, in particular as far as the work tool end 52 of the air filter component 12. The outer side spacing w1, w2 is minimal with respect to the longitudinal direction 50 in the region of the bale portion 30 of the bale handle 27, in particular in the region of the work tool end 52 of the air filter component 12. When viewed as a plan view from above toward the work apparatus 1 located in the set-down position in the direction perpendicular to the horizontal plane, the work apparatus 1, in particular the housing 5 of the work apparatus 1, is wedge-shaped at least in the region of the air filter component 12, in particular in the region of the filter's longitudinal extent 70.

The outer side of the first side surface 21 has a spacing region. The spacing region is located in the region of the filter's longitudinal extent 70, in particular in the front half 71. The spacing region is located under the bale portion 30 in the direction perpendicular to the work tool plane E. The spacing region is located under the bale portion 30 only in the direction perpendicular to the work tool plane E. The bale handle 27 has in the bale portion 30 a bale projection b above the spacing region. The bale projection b is a spacing of the bale portion 30 in the direction perpendicular to the work tool plane E relative to the outer side of the first side surface 21. In this case, it is a geometric spacing. The bale projection indicates the smallest distance, measured in the direction perpendicular to the work tool plane E, between the bale portion 30 and the spacing region. The bale projection b is the spacing which the bale portion 30 has in the direction perpendicular to the work tool plane E relative to the first side surface 21, in particular relative to the housing 5 of the work apparatus 1, in particular relative to the spacing region. The bale projection b is also referred to as the bale spacing.

The bale handle 27 has in the bale portion 30 a center of gravity spacing s, which is measured perpendicularly to the work tool plane E, relative to the mass center of gravity 40 of the work apparatus 1. This is also illustrated in FIG. 4. The bale projection b is from 20% to 60%, in particular from 30% to 50%, in the embodiment from 35% to 45% of the center of gravity spacing s. In the embodiment, the center of gravity spacing s is from 9 cm to 15 cm, in particular from 11 cm to 13 cm. In all the embodiments, the bale handle 27 has in the entire bale portion 30 the same center of gravity spacing s. In the embodiments, the bale handle 27 has the same bale projection b in the entire bale portion 30.

As illustrated in FIG. 3, the base body 37, in particular the base housing 38, in particular the housing 5, has a total height h which is measured in the direction perpendicular to the longitudinal direction 50 and in the direction parallel to the work tool plane E. the total height h is measured in the set-down position perpendicularly to the horizontal plane. The work apparatus 1 includes a brake lever 43. The brake lever 43 is supported pivotably on the base body 37, in particular on the housing 5, in particular on the base housing 38. The brake lever 43 is not a component of the base body 37, in particular not a component of the housing 5, in particular not a component of the base housing 38. The bale handle 27 is not a component of the base body 37, in particular not a component of the housing 5, in particular not a component of the base housing 38. The bale portion 30 extends in the same direction as the total height h over a bale portion length c. The bale portion length c is from 10% to 60%, in particular from 20% to 50%, in particular from 30% to 40% of the total height h. The bale portion 30 has in the set-down position a spacing, measured perpendicularly to the horizontal plane, relative to the horizontal plane of at least 10% of the total height h of the base housing 38. The bale portion 30 has in the set-down position a spacing, measured perpendicularly to the horizontal plane, relative to the horizontal plane of at most 40% of the total height h of the base housing 38.

Over at least 10%, in particular at least 20%, in the embodiment at least 25% of the total height h, the bale portion 30 has the same bale spacing b, in particular the same center of gravity spacing s.

As illustrated in FIG. 1, the work apparatus 1 includes a filter cover 13. In all the embodiments, except in the embodiment according to FIG. 2A (and FIG. 4 if it relates to the embodiment according to FIG. 2A), the work apparatus 1 includes the filter cover 13.

In the embodiment according to FIG. 2A, no filter cover 13 is provided. The air filter component 12 forms in the embodiment according to FIG. 2A the first side surface 21, in particular the outer side of the first side surface 21. The cooling air directly strikes the air filter component 12 from the outer side in the direction transverse, in particular in the direction perpendicular to the work tool plane E. The air filter component 12 is a portion of the outer wall 10, in particular of the outer side of the outer wall 10.

In the remaining embodiments, the filter cover 13 is arranged on the base body 37 of the work apparatus 1. The filter cover 13 is configured separately from a base body 37 of the work apparatus 1. The filter cover 13 is fastened on the base body 37. The filter cover 13 is arranged on the opening 41 of the base housing 38 of the base body 37. The filter cover 13 covers the opening 41 at least partially. This applies to all the embodiments except for FIG. 2A. In these embodiments, the inlet opening 4 is configured in the filter cover 13. However, there may also be provision for the inlet opening 4 to be configured in the base housing 38 of the work apparatus 1. In the embodiments (except for FIG. 2A), the lower inlet opening 11 is configured in the filter cover 13. However, there may also be provision for the lower inlet opening 11 to be configured in the base housing 38 of the hand-guided work apparatus 1. As illustrated in FIGS. 3 and 4 and 11 and 12, the inlet space 24 is delimited by the filter cover 13. The filter cover 13 forms a portion of the first side surface 21, in particular the outer side of the first side surface 21. The filter cover 13 forms a portion of the outer wall 10.

In the embodiments (except for FIG. 2A), the air filter component 12 is arranged between the base housing 38 and the filter cover 13. The filter cover 13 serves to cover the opening 41 of the base housing 38. The filter cover 13 serves to guide the cooling air. The filter cover 13 serves to retain the air filter component 12.

As illustrated, for example, in FIG. 2, the filter cover 13 can be fastened to the base housing 38 of the work apparatus 1 in particular by a single fastening element 15. The filter cover 13 can be fastened to the base housing 38 in particular by a single, central fastening element 15. As illustrated in FIG. 2, the fastening element 15 is arranged in a side view toward the work apparatus 1 in the direction perpendicular to the work tool plane E approximately at the center of the filter cover 13. In this side view, the fastening element 15 is arranged approximately centrally in the region of the centroid of an area of the filter cover 13. There may also be provision for the fastening element 15 to be arranged precisely in the centroid of an area of the filter cover 13. In the embodiments (except for FIG. 2A), the fastening element 15 is a screw. However, the fastening element may also be in the form of a rotatable bayonet closure or may be configured in another, alternative manner. The fastening element 15 can be screwed through the filter cover 13 into the base body 37. The screw direction extends in the direction transverse, in particular in the direction perpendicular to the work tool plane E.

Figure 13:
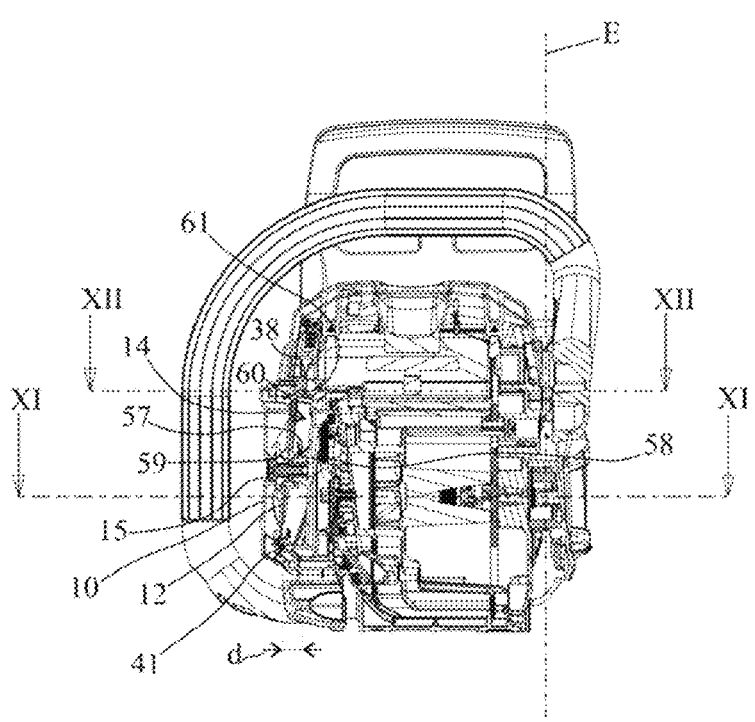
FIG. 13 shows a sectioned illustration of a vertical section through the work apparatus from FIG. 9 with the assembled air filter component and assembled filter cover along the plane of section XIII-XIII depicted in FIG. 11.
Figure 13A:
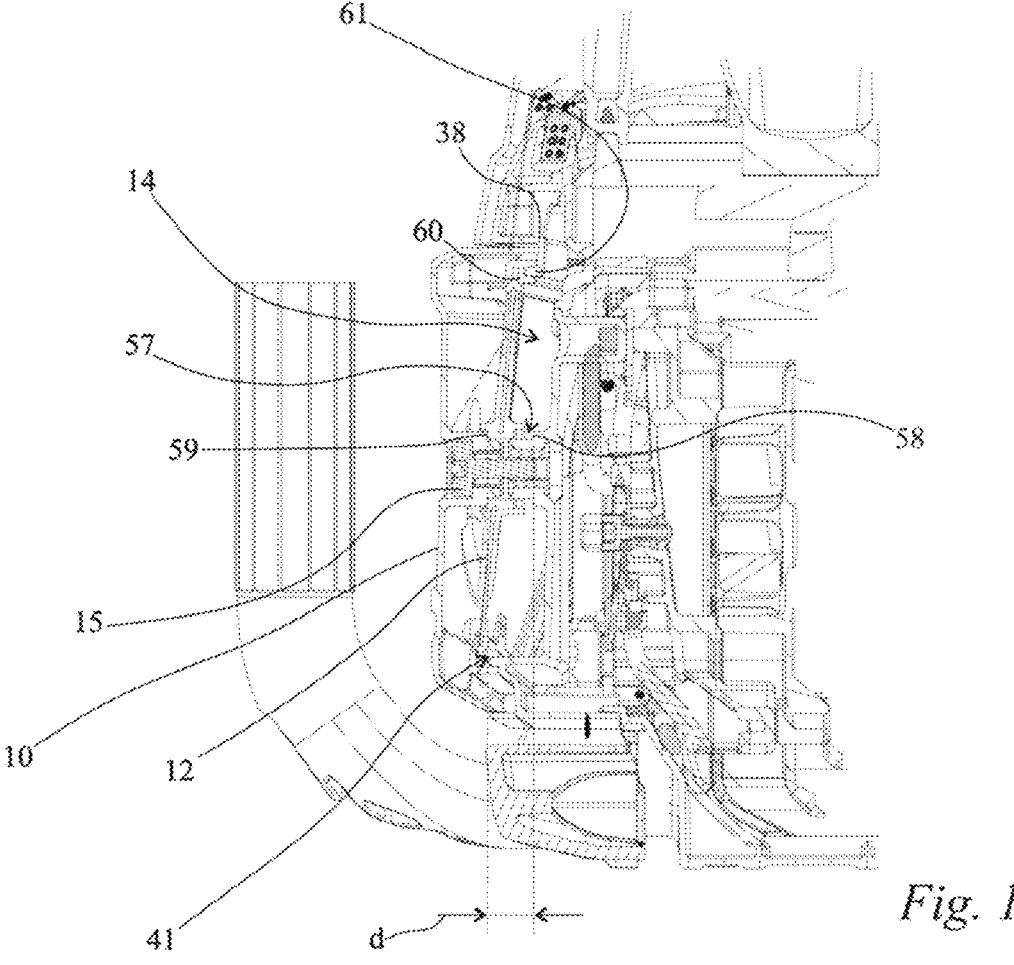
FIG. 13A shows an enlarged detail from FIG. 13.
Figure 14:
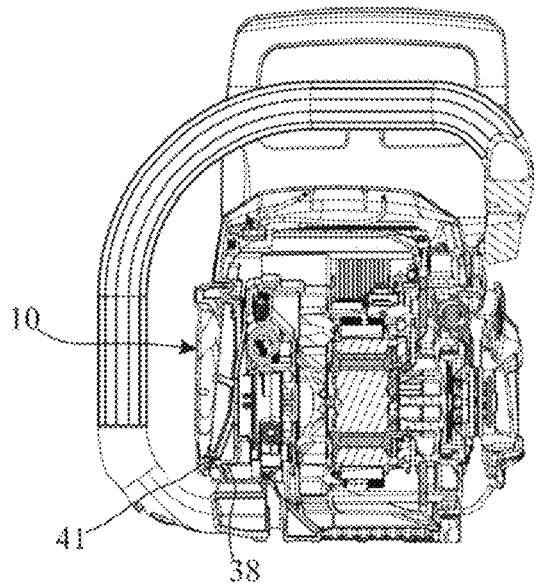
FIG. 14 shows a sectioned illustration of a vertical section through the work apparatus from FIG. 9 with the assembled air filter component and assembled filter cover along the plane of section XIV-XIV depicted in FIG. 11.

The air filter component 12 is (in all the embodiments except for according to FIG. 2A) arranged between the filter cover 13 and the base housing 38. The air filter component 12 is retained with play between the filter cover 13 and the base body 37 of the work apparatus 1. The fastening element 15 fastens the filter cover 13 to the base body 37 so that a retention space 57 is formed between the filter cover 13 and the base body 37 (FIGS. 13 and 13A). The air filter component 12 is retained in the retention space 57. The air filter component 12 has the play in the direction transverse, in particular in the direction perpendicular to the longitudinal direction 50. The air filter component 12 has the play in the direction transverse, in particular in the direction perpendicular to the work tool plane E.

A first stop region 58 for the air filter component 12 on the base body 37 is arranged in the region of the fastening element 15. A second stop region 59 for the air filter component 12 on the filter cover 13 is arranged in the region of the fastening element 15. The air filter component 12 is retained with play in the direction from the first stop region 58 to the second stop region 59 between the first stop region 58 and the second stop region 59. The retention space 57 is formed between the first stop region 58 and the second stop region 59. In the embodiment, the first stop region 58 is opposite the second stop region 59 in the direction transverse, in particular in the direction perpendicular to the work tool plane E. The air filter component 12 is retained with play with respect to the direction transverse, in particular perpendicular to the work tool plane E between the first stop region 58 and the second stop region 59. The first stop region 58 and the second stop region 59 are arranged with a spacing d relative to each other as measured in the direction transverse, in particular perpendicular to the work tool plane E. The retention space 57 has a height which corresponds approximately to the spacing d. The air filter component 12 extends in the region of the fastening element 15 in the direction transverse, in particular in the direction perpendicular to the work tool plane E, over at least 80%, in the embodiment over at least 90% of the spacing d. The air filter component 12 extends in the region of the fastening element 15 in the direction transverse, in particular in the direction perpendicular to the work tool plane E over at most 98%, in the embodiment over at most 95% of the spacing d.

As illustrated in FIG. 13 and FIG. 13A, the air filter component 12 bears on the base body 38 (not in the embodiment according to FIG. 2A). The air filter component 12 has a fitting groove 60 which extends around the direction perpendicular to the work tool plane E. The base body 38 has an end wall 61 which extends around the direction perpendicular to the work tool plane E. The end wall 61 has an outer side, an inner side and an end side. The fitting groove 60 has groove side walls. The air filter component 12 is fitted with the fitting groove 60 onto the end wall 61. The fitting groove 60 engages round the end wall 61. The end wall 61 corresponds to the fitting groove 60. The fitting groove 60 bears with the groove side walls against the outer side and inner side of the end wall 61. A spacing exists between the end side of the end wall 61 and the groove base of the fitting groove 60. It is thereby possible to produce the air filter component 12 with a large production tolerance. It is thereby possible for the filter cover 13 to bear against the base housing 38 without gaps in a hood-like manner because the filter cover 13 can be readily pressed against the base body 37. In this case, the groove base and the end side can move closer together without touching each other. As a result of the abutment of the groove side walls against the outer side and inner side of the end wall 61, the air filter component 12 is connected to the base body 37 in an air-tight manner. Play exists between the end wall 61 and the fitting groove 60 with respect to the direction transverse, in particular perpendicular to the work tool plane E.

The inlet space 24 is arranged on the first side surface 21 (except for FIG. 2A). The inlet opening 4 is arranged in the first side surface 21 of the work apparatus 1. The filter cover 13 is a component of the first side surface 21 of the work apparatus 1. As illustrated in FIG. 4, the filter cover 13 is substantially wedge-shaped in the set-down position of the work apparatus 1 in a view perpendicular to the horizontal plane, in particular in a view perpendicular to the base 17.

In the embodiments (except for FIG. 2A), the inlet space 24 is at least partially delimited by the filter cover 13. The inlet space 24 is configured between the filter cover 13 and the air filter component 12. The filter cover 13 is substantially hood-like. At the end facing the rear end 3 of the work apparatus 1, the filter cover 13 has the inlet opening 4. At the side, which faces the opening 41, of the filter cover 13, the filter cover 13 has an abutment surface for abutting against the base housing 38 of the base body 37 of the hand-guided work apparatus 1. In particular, the abutment surface bears against the base housing 38. The abutment surface of the filter cover 13 runs around the opening 41 in an advantageously closed manner. The abutment surface bears tightly against the base housing 38. The inlet opening 4 extends completely through the filter cover 13. The inlet opening 4 is delimited on all sides by material of the filter cover 13.

The filter cover 13 delimits the work apparatus 1 in an outward direction. The filter cover 13 is a component of the housing 5. The filter cover 13 has a cover which forms a portion of the external first side surface 21 of the work apparatus 1. The cover delimits the filter cover 13 in the direction transverse, in particular in the direction perpendicular to the work tool plane E. The cover is free from openings for the introduction of cooling air into the work apparatus 1. The filter cover 13 has side walls. The side walls and the cover delimit the inlet space 24. The inlet opening 4 is arranged in a side wall of the filter cover 13. The cover of the filter cover 13 is supported via the side walls on the base housing 38.

The filter cover 13 has in the side view perpendicular to the first side 46 of the work tool plane E a cover outer contour 18 which is illustrated in FIG. 2. In FIGS. 1 and 2, the filter outer contour 28, the filter surface 29, the cover outer contour 18, a cover surface 19, the inlet space 24 and the opening 41 are schematically depicted with the same broken line. In fact, however, the cover outer contour 18 is greater than the filter outer contour 28. The cover outer contour 18 completely surrounds the inlet space 24. The cover outer contour 18 completely surrounds the opening 41 of the base housing 38. The cover outer contour 18 delimits a notional cover surface 19 in the case of a projection of the cover outer contour 18 in the direction perpendicular to the work tool plane E onto the work tool plane E in the work tool plane E. The filter cover 13 is free from openings for the introduction of cooling air into the work apparatus 1 in the side view perpendicularly toward the first side 46 of the work tool plane E within the cover outer contour 18 over at least 85%, in particular over at least 90%, in the embodiment over at least 95% of the cover surface 19. A notional projection of the filter cover 13 in the direction perpendicular to the work tool plane E onto the work tool plane E is free from openings for the introduction of cooling air into the work apparatus 1 within the cover outer contour 18, which is projected in the same manner onto the work tool plane E, over at least 85%, in particular over at least 90%, in the embodiment over at least 95% of the cover surface 19. The term "opening" is also intended to be understood as defined above in connection with the filter cover 13. In this instance, it is a portion of a penetration opening which is visible in a view perpendicular to the first side 46 of the work tool plane E.

In all the embodiments, in order to supply energy to the motor 7 which is in the form of an electric motor, a battery pack which is not illustrated is provided. The hand-guided work apparatus 1 is a battery-operated work apparatus. There may also be provision for a battery, for supplying energy, to be used, in particular a replaceable battery. The following description in relation to the battery pack also relates to a battery. As illustrated, for example, in FIGS. 2 and 4, the housing 5, in particular the base housing 38, has a receiving bay 22 for the battery pack. The receiving bay 22 has a receiving opening 23. The battery pack can be inserted into the receiving bay through the receiving opening 23. The battery pack can be inserted in an insertion direction 48 into the receiving bay 22.

As can be seen in FIGS. 2 to 4, the first side surface 21 is free from the receiving opening 23 of the receiving bay 22 for the battery pack. The receiving opening 23 of the receiving bay 22 for the battery pack extends only in the housing cover 20 of the housing 5, in particular of the base housing 38. The insertion direction 48 extends parallel with the work tool plane E. The receiving opening 23 runs around the insertion direction 48 in a closed manner. The receiving opening 23 has an edge which extends around the insertion direction 48 in a closed manner. When the battery pack is inserted into the receiving bay 22, the battery pack is substantially introduced counter to the upward direction 49 downward through the receiving opening 23 into the receiving bay 22.

The receiving bay 22 is arranged in the region of the filter's longitudinal extent 70, in particular in the region of the back half 72 of the filter's longitudinal extent 70 with respect to the longitudinal direction 50, as illustrated by way of example for all the embodiments in FIG. 4.

A notional projection of the air filter component 12 in the direction perpendicular to the work tool plane E onto the work tool plane E and a notional projection of the receiving bay 22 in the direction perpendicular to the work tool plane E onto the work tool plane E overlap each other in the work tool plane E. As illustrated in FIG. 2 by way of example for all the embodiments, the receiving bay 22 has in a notional projection in the direction perpendicular to the work tool plane E onto the work tool plane E a battery outer contour 65. The battery outer contour 65 delimits a notional battery surface 66. The battery surface 66 extends in the work tool plane E. In FIG. 2, the battery surface 66 is schematically depicted with a broken line. The filter surface 29 and the battery surface 66 overlap each other in the work tool plane E.

As illustrated in FIG. 4 by way of example for all the embodiments, the receiving bay 22 has a depth t1 measured in the longitudinal direction and a width t2 measured perpendicularly to the work tool plane E. The width t2 is greater than the depth t1. The base body 37 has a maximum width bm measured in the direction perpendicular to the work tool plane E. The width t2 of the receiving bay 22 is at least 50%, in particular at least 60% of the maximum width bm of the base body 37 of the work apparatus 1. The base body 37 of the work apparatus 1 has the maximum width bm in the back half 72 of the filter's longitudinal extent 70 of the air filter component 12.

The receiving bay 22 is arranged in the region of the back half 72 of the filter's longitudinal extent 70. The receiving bay 22 is arranged in the region of the back half, with respect to the longitudinal direction 50, of the inlet space 24.

The position of the mass center of gravity 40 of the work apparatus 1 is determined with the battery inserted. The position of the mass center of gravity 40 of the work apparatus 1 is determined with a battery inserted in the battery bay 22.

The cooling air is drawn into the work apparatus 1 by a fan, which is not illustrated in the FIGS., of the work apparatus 1, and guided along the flow path 26. The flow path 26 is schematically depicted with broken lines in FIGS. 1, 3 and 4. The cooling air is introduced through the inlet opening 4 into the work apparatus 1 (in all the embodiments except for the one according to FIG. 2A). In the embodiment according to FIG. 2A (and FIG. 4 if it relates to FIG. 2A), the cooling air is initially introduced through the air filter component 12 into the work apparatus 1. Subsequently, the cooling air is introduced through the lateral inlet opening 62 into the clean air region 14.

In the remaining embodiments (except for FIG. 2A), the cooling air flows through the inlet opening 4 in the direction of the longitudinal direction 50. The cooling air is directly introduced through the inlet opening 4 into the inlet space 24 which is formed by the filter cover 13 and the air filter component 12. The cooling air flows in the inlet space 24 along the air filter component 12, in particular along the filter surface, in the direction from the rear end 3 toward the front end 2. In this case, cooling air is introduced through the air filter component 12 and through the opening 41 in the base housing 38 of the base body 37 into the clean air chamber 14. While flowing along the air filter component 12, the volume of cooling air in the inlet space 24 decreases in the longitudinal direction 50 because more and more cooling air is discharged by the air filter component 12 out of the inlet space 24 into the clean air chamber 14. To the same extent, the surface of the flow cross sections 31, 32 also decreases in the longitudinal direction 50. It is thereby possible for the volume flow in the inlet space 24 to be kept substantially constant. This ensures advantageous flow relationships. The cooling air can be distributed uniformly over the air filter component 12, in particular over the filter surface, and can penetrate over the entire surface of the air filter component 12 with a similar volume flow into the clean air chamber 14. In this instance, the cooling air flows in the direction transverse to the work tool plane E into the clean air chamber 14. In this case, the cooling air flows in the direction transverse to the longitudinal direction 50 into the clean air chamber 14. In the clean air chamber 14 and in the interior space 39, the cooling air then flows along the flow path 26 in an upward direction 49 to the electronic unit of the motor 7 which is in the form of an electric motor. In this instance, the electronic unit of the electric motor is cooled. Then, the cooling air flows counter to the upward direction 49 to the motor 7 which is in the form of an electric motor. The cooling air leaves the work apparatus 1 through an opening in the base 17.

As a result of the wedge-shaped configuration of the base body 37, the bale handle 27, in particular the bale portion 30 of the bale handle 27, can be arranged so as to save structural space and with little spacing from the mass center of gravity 40 of the work apparatus 1. The levers and pivoting forces for guiding and operating the work apparatus 1 via the bale handle 27 are thereby small.

It is understood that the foregoing description is that of the preferred embodiments of the invention and that various changes and modifications may be made thereto without departing from the spirit and scope of the invention as defined in the appended claims.

The invention claimed is:

1. A hand-guided work apparatus comprising:
a work tool;
an operator-controlled handle;
a motor configured to drive said work tool;

the hand-guided work apparatus defining a longitudinal direction extending in a direction from said operator-controlled handle to said work tool;

said work tool defining a work tool plane;

an air filter component for filtering cooling air for cooling said motor;

wherein the work apparatus is configured to be set down in a set-down position on a horizontal plane;

the work apparatus having a base which faces the horizontal plane in the set-down position;

a housing cover disposed opposite said base, wherein the work apparatus has a side surface which connects said housing cover and said base to each other and which delimits the work apparatus in the longitudinal direction in a direction perpendicular to said work tool plane;

said air filter component being arranged on said side surface;

said air filter component having a filter's longitudinal extent in the longitudinal direction;

wherein an imaginary tangential plane, which extends in said set-down position perpendicularly to the horizontal plane, is tangent to said side surface only in a region of said filter's longitudinal extent;

said imaginary tangential plane intersecting with said work tool plane;

said filter's longitudinal extent including a front half and a back half with respect to the longitudinal direction, wherein said front half with respect to the longitudinal direction is arranged in front of said back half;

wherein said imaginary tangential plane is tangent to said side surface in a region of said back half of said filter's longitudinal extent of said air filter component; and, said imaginary tangential plane intersecting with said work tool plane with respect to the longitudinal direction in front of a region of said filter's longitudinal extent.

2. The hand-guided work apparatus of claim 1, wherein said tangential plane with said work tool plane defines an angle $\alpha$; and, said angle $\alpha$ is at least one of:
at least 1°; and,
at most 45°.

3. The hand-guided work apparatus of claim 1, wherein, measured perpendicularly to said work tool plane, an outer side spacing of an outer side of said side surface to said work tool plane decreases in the region of the filter's longitudinal extent of the air filter component in the longitudinal direction.

4. The hand-guided work apparatus of claim 1 further comprising a bale handle having a bale portion located in the region of the filter's longitudinal extent and in the direction perpendicular to said work tool plane above said side surface.

5. The hand-guided work apparatus of claim 4, wherein an outer side of said side surface has a spacing region located under said bale portion in the direction perpendicular to said work tool plane; said bale handle has in said bale portion a bale projection, which is measured perpendicularly to said work tool plane, above the spacing region; said bale handle has in said bale portion a center of gravity spacing which is measured perpendicularly to said work tool plane relative to a mass center of gravity of the work apparatus; and, said bale projection is from 20% to 60% of said center of gravity spacing.

6. The hand-guided work apparatus of claim 1, wherein, measured perpendicularly to said work tool plane, an outer side spacing of an outer side of said side surface to said work tool plane decreases in the region of the filter's longitudinal extent of the air filter component in the longitudinal direction; the work apparatus further comprising:

a bale handle having a bale portion located in the region of the filter's longitudinal extent and in the direction perpendicular to said work tool plane over said side surface; and, said outer side spacing with respect to the longitudinal direction is minimal in a region of said bale portion of said bale handle.

7. The hand-guided work apparatus of claim 1, wherein the work apparatus defines an inlet space for introducing cooling air, which is to be filtered by said air filter component, into the work apparatus; said inlet space is delimited by said side surface; and, said inlet space has an inlet opening through which cooling air can flow from outside into said inlet space in the longitudinal direction.

8. The hand-guided work apparatus of claim 7, wherein said inlet space is delimited by said air filter component.

9. The hand-guided work apparatus of claim 7 further comprising a filter cover; and, said inlet space being delimited by said filter cover.

10. The hand-guided work apparatus of claim 9, wherein said filter cover forms a portion of said side surface.

11. The hand-guided work apparatus of claim 9, wherein said filter cover is wedge-shaped in a view perpendicular to the horizontal plane in the set-down position.

12. The hand-guided work apparatus of claim 9, wherein at least one of said filter cover and said air filter component is configured to be fastened to said base body by a single fastening element.

13. The hand-guided work apparatus of claim 1, wherein the work apparatus has a receiving bay for a battery pack; and, said receiving bay is configured to have the battery pack therein in an insertion direction through a receiving opening of said receiving bay.

14. The hand-guided work apparatus of claim 13, wherein said receiving bay is arranged with respect to the longitudinal direction in the region of said filter's longitudinal extent.

15. The hand-guided work apparatus of claim 13, wherein said receiving bay has a depth measured in the longitudinal direction and a width measured perpendicularly to said work tool plane; and, said width is greater than said depth.

16. A hand-guided work apparatus comprising:

a work tool;

an operator-controlled handle;

a motor configured to drive said work tool;

wherein the work apparatus defines a longitudinal direction extending in a direction from said operator-controlled handle to said work tool;

an air filter component;

the work apparatus defining an inlet space for introducing cooling air to be filtered by said air filter component into the work apparatus;

said inlet space having at least one inlet opening for introducing the cooling air from outside into the work apparatus;

said air filter component delimiting the inlet space;

said inlet space delimiting a portion of a flow path for the cooling air;

said flow path leading from said inlet opening to said motor;

said inlet space having, along said flow path, flow cross sections which extend perpendicularly to the longitudinal direction for the cooling air;

said inlet opening being arranged such that the cooling air is configured to flow in the longitudinal direction through said inlet opening;

said air filter component delimiting said flow cross sections; and, said flow cross sections becoming smaller in the longitudinal direction of the work apparatus.

17. The hand-guided work apparatus of claim 16, wherein said flow cross sections become smaller continuously in the longitudinal direction.

18. The hand-guided work apparatus of claim 16, wherein the cooling air flows in said inlet space along a filter surface of said air filter component.

19. The hand-guided work apparatus of claim 18, wherein the cooling air is introduced gradually into a clean air chamber of the work apparatus through said air filter component while flowing along said filter surface.

20. The hand-guided work apparatus of claim 16, wherein said inlet space is delimited at least at one side by an outer wall of the work apparatus.

21. The hand-guided work apparatus of claim 20, wherein said flow cross sections are delimited by said outer wall.

22. The hand-guided work apparatus of claim 16 further comprising:

a housing cover;

the work apparatus having a base facing a horizontal plane in a set-down position;

said housing cover being disposed opposite a base;

a side surface connecting said housing cover and said base to each other and delimiting the work apparatus in the longitudinal direction in a direction perpendicular to a work tool plane; and, said inlet space being arranged on said side surface.

23. The hand-guided work apparatus of claim 22, wherein said inlet opening is arranged on said side surface.

* * * * *